(12) United States Patent
Monro

(10) Patent No.: US 7,707,213 B2
(45) Date of Patent: *Apr. 27, 2010

(54) HIERARCHICAL UPDATE SCHEME FOR EXTREMUM LOCATION

(76) Inventor: Donald Martin Monro, 6, The Lays, Goose Street, Beckington, Somerset, BA11 6RS (GB)

(*) Notice: Subject to any disclaimer, the term of this patent is extended or adjusted under 35 U.S.C. 154(b) by 267 days.

This patent is subject to a terminal disclaimer.

(21) Appl. No.: 11/677,511

(22) Filed: Feb. 21, 2007

(65) Prior Publication Data

US 2008/0201352 A1 Aug. 21, 2008

(51) Int. Cl.
*G06F 7/06* (2006.01)
(52) U.S. Cl. .............................. 707/737; 707/E17.005; 375/E7.203
(58) Field of Classification Search ......... 707/100–101, 707/102, E17.005, 791; 375/E7.203
See application file for complete search history.

(56) References Cited

U.S. PATENT DOCUMENTS

| | | | |
|---|---|---|---|
| 4,168,513 A | 9/1979 | Hains et al. | |
| 4,509,038 A | 4/1985 | Hirano | |
| 4,675,809 A | 6/1987 | Omoda et al. | |
| 4,908,873 A | 3/1990 | Philibert et al. | |
| 5,218,435 A | 6/1993 | Lim et al. | |
| 5,315,670 A | 5/1994 | Shapiro | |
| 5,321,776 A | 6/1994 | Shapiro | |
| 5,412,741 A | 5/1995 | Shapiro | |
| 5,559,931 A | 9/1996 | Shindou et al. | |
| 5,699,121 A | 12/1997 | Zakhor et al. | |
| 5,748,786 A | 5/1998 | Zandi et al. | |
| 5,754,704 A | 5/1998 | Barnsley et al. | |
| 5,768,437 A | 6/1998 | Monro et al. | |
| 5,819,017 A | 10/1998 | Akeley et al. | |
| 5,873,076 A | 2/1999 | Barr et al. | |
| 5,956,429 A | 9/1999 | Burns | |
| 6,029,167 A | 2/2000 | Evans | |
| 6,052,416 A | 4/2000 | Koga | |
| 6,078,619 A | 6/2000 | Monro et al. | |

(Continued)

FOREIGN PATENT DOCUMENTS

EP 0 595 599 A2 5/1994

(Continued)

OTHER PUBLICATIONS

Brin et al., Copy detection mechanisms for digital documents, Proceedings of the 1995 ACM SIGMOD international conference on Management of data SIGMOD '95, Volumer 24 ACM Press, May 1995, pp. 398-409.

(Continued)

*Primary Examiner*—Tim T. Vo
*Assistant Examiner*—Shiow-Jy Fan
(74) *Attorney, Agent, or Firm*—Sterne, Kessler, Goldstein & Fox, P.L.L.C.

(57) ABSTRACT

A system and method for determining an extreme value of data in various applications including audio, video and image encoding schemes. The system and method are used to build a hierarchical data structure by partitioning the data values and then constructing a hierarchy using these data values, with the apex containing the extreme value. The system and method allow for changes in the data values in the base level of the hierarchy to ripple through to the apex in an efficient manner.

59 Claims, 10 Drawing Sheets

U.S. PATENT DOCUMENTS

| | | | |
|---|---|---|---|
| 6,086,706 | A | 7/2000 | Brassil et al. |
| 6,125,348 | A | 9/2000 | Levine |
| 6,144,835 | A | 11/2000 | Inoue |
| 6,208,744 | B1 | 3/2001 | Ishige et al. |
| 6,336,050 | B1* | 1/2002 | Amin et al. .................. 700/28 |
| 6,434,542 | B1* | 8/2002 | Farmen et al. ................ 706/45 |
| 6,480,547 | B1* | 11/2002 | Chen et al. ............. 375/240.27 |
| 6,556,719 | B1 | 4/2003 | Monro |
| 6,625,213 | B2* | 9/2003 | Bottreau et al. ........ 375/240.08 |
| 6,654,503 | B1 | 11/2003 | Sudharsanan et al. |
| 6,820,079 | B1 | 11/2004 | Evans |
| 6,847,966 | B1 | 1/2005 | Sommer et al. |
| 6,990,142 | B2 | 1/2006 | Chappaz |
| 6,990,145 | B2 | 1/2006 | Monro et al. |
| 7,003,039 | B2 | 2/2006 | Zakhor et al. |
| 7,079,986 | B2 | 7/2006 | Sieracki |
| 7,230,551 | B2 | 6/2007 | Moriya et al. |
| 2002/0069206 | A1* | 6/2002 | Bergman et al. ............ 707/100 |
| 2003/0108101 | A1* | 6/2003 | Frossard et al. ........ 375/240.03 |
| 2004/0028135 | A1 | 2/2004 | Monro |
| 2004/0126018 | A1 | 7/2004 | Monro |
| 2004/0165737 | A1 | 8/2004 | Monro |
| 2004/0218836 | A1 | 11/2004 | Kanatsu |
| 2005/0149296 | A1 | 7/2005 | Sieracki |
| 2007/0016414 | A1 | 1/2007 | Mehrotra et al. |
| 2007/0030177 | A1 | 2/2007 | Monro |
| 2007/0053434 | A1 | 3/2007 | Monro |
| 2007/0053597 | A1 | 3/2007 | Monro |
| 2007/0053603 | A1 | 3/2007 | Monro |
| 2007/0164882 | A1 | 7/2007 | Monro |
| 2007/0252733 | A1 | 11/2007 | Thebault et al. |
| 2007/0258654 | A1 | 11/2007 | Monro |
| 2007/0282933 | A1 | 12/2007 | Monro |
| 2007/0290898 | A1 | 12/2007 | Monro |
| 2007/0290899 | A1 | 12/2007 | Monro |
| 2008/0005648 | A1 | 1/2008 | Monro |
| 2008/0055120 | A1 | 3/2008 | Monro |
| 2008/0056346 | A1 | 3/2008 | Monro |
| 2008/0084924 | A1 | 4/2008 | Monro |
| 2008/0086519 | A1 | 4/2008 | Monro |

FOREIGN PATENT DOCUMENTS

| | | |
|---|---|---|
| EP | 0 836 325 A1 | 4/1998 |
| EP | 1 545 010 A1 | 6/2005 |
| EP | 1 610 560 A | 12/2005 |
| GB | 2 293 733 A | 4/1996 |
| GB | 2 409 943 A | 7/2005 |
| WO | WO 97/16029 | 5/1997 |
| WO | WO98/11730 | 3/1998 |
| WO | WO99/08449 | 2/1999 |
| WO | WO01/15456 | 3/2001 |
| WO | WO01/63935 | 8/2001 |
| WO | WO02/13538 | 2/2002 |
| WO | WO2004/051863 | 6/2004 |
| WO | WO2005/027049 | 3/2005 |
| WO | WO 2005/064799 | 7/2005 |
| WO | WO 2005/067661 | 7/2005 |
| WO | WO2005/119581 | 12/2005 |
| WO | WO2007/030702 | 3/2007 |
| WO | WO2007/030784 | 3/2007 |
| WO | WO2007/030785 | 3/2007 |
| WO | WO2007/030788 | 3/2007 |
| WO | WO 2007/084336 | 7/2007 |
| WO | WO 2007/118220 | 10/2007 |
| WO | WO 2007/145875 | 12/2007 |
| WO | WO 2007/149358 | 12/2007 |
| WO | WO 2007/149383 | 12/2007 |
| WO | WO 2007/149384 | 12/2007 |
| WO | WO 2008/027450 | 3/2008 |
| WO | WO 2008/030426 | 3/2008 |
| WO | WO/2008/04281 | 4/2008 |
| WO | WO/2008/045280 | 4/2008 |

OTHER PUBLICATIONS

Cancedda et al., Word Sequence Kernels, Mar. 2003, MIT Press, Journal of Machine Learning Research, vol. 3 Special Edition, pp. 1059-1082.

Cover et al. "Elements of Information Theory" Copyright Jon Wiley & Sons, Inc., p. 96, 1991.

De Natale, et al., "A Mesh-Interpolation Scheme for Very-Low Bitrate Coding of Video Sequences" European Transactions on Telecommunications, vol. 9, No. 1, pp. 47-55, 1998.

De Vleeschouwer et al., "Subband dictionaries for low-cost matching pursuits of video residues," IEEE Transactions on Circuits and Systems for Video Technology, vol. 9, Issue 7, pp. 984-993, Oct. 1999.

Gamito et al. "Lossless Coding of Floating Point Data with JPEG 2000 Part 10" Proceedings of the SPIE, SPIE, Bellingham, VA, US. vol. 5558, Aug. 2, 2004. pp. 276-287.

Golomb, S.W., "Run-length encodings" IEEE Trans Info Theory, Jul. 1966, 12(3):399-401.

Horst et al. "Mupcos: A multi-purpose coding scheme" Signal Processing: Image Communication 5, pp. 75-89, 1993.

Hosang, M., "A Character Elimination Algorithm for Lossless Data Compression" Data Compression Conference, Proceedings. DCC, IEEE Computer Society Press, Los Alamitos, CA, US, Apr. 2, 2002, pp. 1-10.

Huffman, David A., "A Method for the Construction of Minimum-Redundancy Codes," Pro. Inst. Radio Eng., 1952, 9 (40), pp. 1098-1101.

Hull, Jonathan J., "Document Image Matching and Retrieval with Multiple Distortion-Invariant Descriptors", International Association for Pattern Recognition Workshop on Document Analysis Systems, Series in Machine Perception and Artificial Intelligence, vol. 14, published by World Scientific Publishing Co. Pte. Ltd. 1995, pp. 379-396.

Jun-peng Bao et al., "A new text feature extraction model and its application in document copy detection" Machine Learning and Cybernetics, 2003, International Conference on Nov. 2-5, 2003 Piscataway, NJ, USA, IEEE, vol. 1, Nov. 2, 2003, pp. 82-87.

Larsson, N.J., "The Context Trees of Block Sorting Compression" In Proceedings of the IEEE Data Compression Conference, Snowbird, Utah, Mar. 30-Apr. 1, pp. 189-198. IEEE Computer Society Press, 1998.

Said et al., "A New, Fast, and Efficient Image Codec Based on Set Partitioning in Heirarchical Trees" IEEE Transactions on Circuits and Systems for Video Technology, vol. 6, No. 3, pp. 243-250, Jun. 1996.

Sayood, Khalid, "Introduction to Data Compression" Morgan Kaufmann Publishers Inc., San Francisco, CA, USA 1996, pp. 27-32.

Sayood, Khalid, "Introduction to Data Compression" Morgan Kaufrnann Publishers Inc., San Francisco, CA, USA 1991, pp. 98-99.

Salomon, "Data Compression: the complete reference", Springer, pp. 32-33, 1998.

Schleimer et al., Data security protection: Winnowing: local algorithms for document fingerprinting, 2003 ACM SIGMOD international conference on Management of data (SIGMOD '03), ACM Press, Jun. 2003, pp. 76-85.

Teuhola, J. "A Compression Method for Clustered Bit-Vectors" Information Processing Letters, Amsterdam, NL, vol. 7, No. 6, pp. 308-311, Oct. 1978.

Tian et al., "Image Data Processing in the Compressed Wavelet Domain" Proceedings of ICSP'96, pp. 978-981, 1996.

Trott et al. "Wavelets Applied to Lossless Compression and Progressive Transmission of Floating Point Data in 3-D Curvilinear Grids" IEEE Proceedings of the Visualization Conference, Oct. 27, 1996, pp. 385-388.

Donald Monro, U.S. Appl. No. 11/677,515, filed Feb. 21, 2007, entitled "Hierarchical Update Scheme for Extremum Location with Indirect Addressing".

Donald Monro, U.S. Appl. No. 11/678,004, filed Feb. 22, 2007, entitled, "Video Coding With Motion Vectors Determined by Decoder".

Donald Monro, U.S. Appl. No. 11/678,479, filed Feb. 23, 2007, entitled, "Video Coding With Embedded Motion".
Donald Monro, U.S. Appl. No. 11/777,256, filed Jul. 11, 2007.
Donald Monro, U.S. Appl. No. 11/677,511, filed Feb. 21, 2007, entitled "Hierarchical Update Scheme for Extremum Location".
Donald Monro, U.S. Appl. No. 11/777,239, filed Jul. 12, 2007.
Donald Monro, U.S. Appl. No. 11/777,230, filed Jul. 12, 2007.
Donald Monro, U.S. Appl. No. 11/777,130, filed Jul. 12, 2007.
Donald Monro, U.S. Appl. No. 11/777,144, filed Jul. 12, 2007.
Donald Monro, U.S. Appl. No. 11/777,122, filed Jul. 12, 2007.
Donald Monro, U.S. Appl. No. 11/777,100, filed Jul. 12, 2007.
Donald Monro, U.S. Appl. No. 11/777,081, filed Jul. 12, 2007.
Donald Monro, U.S. Appl. No. 11/777,022, filed Jul. 12, 2007.
Donald Monro, U.S. Appl. No. 11/776,786, filed Jul. 12, 2007.
Donald Monro, PCT Serial No. PCT/US2007/008861, filed Apr. 9, 2007, entitled "Motion Assisted Data Enhancement".
Donald Monro, PCT Serial No. PCT/US2008/002100, filed Feb. 19, 2008, entitled "Hierarchical Update Scheme for Extremum Location".
Donald Monro, PCT Serial No. PCT/US2008/002101, filed Feb. 19, 2008, entitled "Hierarchical Update Scheme for Extremum Location with Indirect Addressing".
International Search Report for Appln. No. PCT/US2007/013100 issued Jan. 14, 2008, 4pgs.
International Search Report for Appln. No. PCT/US2007/000759 issued Feb. 14, 2008, 7pgs.
International Search Report for Appln. No. PCT/US2007/014138 issued Oct. 29, 2007, 2 pgs.
International Search Report for Appln. No. PCT/US2007/014182 issued Jan. 18, 2008, 1 pg.
International Search Report for Appln. No. PCT/US2007/014181 issued Jan. 14, 2008.
Non-Final Office Action for U.S. Appl. No. 11/255,090, completed Feb. 2, 2008, mailed Feb. 6, 2008, 14pgs.
Non-Final Office Action for U.S. Appl. No. 11/332,777, completed Dec. 12, 2007, mailed Dec. 21, 2007, 4pgs.
Final Office Action for U.S. Appl. No. 11/425,142, completed Sep. 10, 2007, mailed Sep. 18, 2007, 9 pgs.
Non-Final Office Action for U.S. Appl. No. 11/425,142, completed Mar. 7, 2007, mailed Mar. 20, 2007, 8 pgs.
Non-Final Office Action U.S. Appl. No. 11/470,611, completed Aug. 29, 2007, mailed Sep. 5, 2007, 6 pgs.
Written Opinion for Appln. No. PCT/US2007/000759 completed Feb. 14, 2007, mailed Feb. 25, 2008, 11pgs.
Final Office Action for U.S. Appl. No. 11/332,777, mailed Aug. 13, 2008, 5 pgs.
Final Office Action for U.S. Appl. No. 11/255,090, mailed Sep. 3, 2008, 11 pgs.
Non-Final Office Action for U.S. Appl. No. 11/425,142, mailed Sep. 16, 2008, 12 pgs.
Monro et al., "Bases for Low Complexity Matching Pursuits Image Coding" www.http://dmsun4.bath.ac.uk.
Yuan et al., "Improved Matching Pursuits Image Coding" IEEE International Conference on Acoustics, Speech and Signal Processing ICASSP 2005, pp. II-201-II-204, Mar. 2005.
Monro, "Basis Picking for Matching Pursuits Image Coding" IEEE International Conference on Image Processing, pp. 2495-2498, Sep. 2004.
Yuan et al., "Low Complexity Separable Matching Pursuits" IEEE Int. Conference Acoustics Speech Signal Process, pp. III-725-III-728, May 2004.
U.S. Appl. No. 11/255,090, filed Oct. 19, 2005, Monro.
Figueras et al., "Color Image Scalable Coding with Matching Pursuit" IEEE Int. Conference Acoustics Speech Signal Process, pp. III-53-III-56, May 2004.
Monro et al., "Improved Coding of Atoms in Matching Pursuits" IEEE Int. Conf. Image Process, vol. 2, Sep. 2003.
Frossard et al., "High Flexibility Scalable Image Coding" Proceedings of VCIP 2003, Jul. 2003.
Poh et al., "Comparison of Residual Compression Methods in Motion Compensated Video" IEEE Int. Workshop on Multimedia Signal Processing, pp. 109-112, Dec. 2002.
Moschetti et al., "New Dictionary and Fast Atom Searching Method for Matching Pursuit Representation of Displaced Frame Difference" IEEE International Conference on Image Processing, pp. III-685-III-688, Sep. 2002.
Neff et al., "Matching Pursuit Video Coding-Part I: Dictionary Approximation" IEEE Trans. Circuits System Video Technology, vol. 12, No. 1, pp. 13-26, Jan. 2002.
Tredwell et al., "A Sequential Vector Selection Algorithm for Controllable Bandwidth Motion Description Encoding" IEEE Sympos. Intell. Multimedia. Video & Speech Process, May 2001.
Czerepinski et al., "Matching Pursuits Video Coding: Dictionaries and Fast Implementation" IEEE Trans Circuit Systems Video Technology, vol. 10, No. 7, pp. 1103-1115, Oct. 2000.
Monro et al., "Visual Embedding of Wavelet Transform Coefficients" IEEE International Conference Image Process, pp. 186-189, Sep. 2000.
Neff et al., "Very Low Bit-Rate Video Coding Based on Matching Pursuits" IEEE Trans. Circuits and Systems for Video Tech., vol. 7, No. 1, pp. 158-171, Feb. 1997.
Mallat et al., "Matching Pursuits with Time-Frequency Dictionaries" IEEE Trans. Signal Processing, vol. 41, No. 12, pp. 3397-3415, Dec. 1993.
Steffen et al., "Theory of Regular $M$-band Wavelet Bases" IEEE Transactions on Signal Processing, vol. 41, No. 12, pp. 3497-3511, Dec. 1993.
Shapiro, "Embedded Image Coding Using Zerotrees of Wavelet Coefficients" IEEE Transactions on Signal Processing, vol. 41, No. 12, pp. 3445-3462, Dec. 1993.
Ramchandran et al., "Best Wavelet Packet Bases in a Rate-Distortion Sense" IEEE Transactions on Signal Processing, vol. 2, No. 2, pp. 160-175, Apr. 1993.
Mallat, "A Theory for Multiresolution Signal Decomposition: The Wavelet Representation" IEEE Trans. Pattern Anal. Mach. Intel., vol. 11, No. 7, Jul. 1989.
Daubechies, "Orthonormal Bases of Compactly Supported Wavelets" Comm. Pure Appl. Math., vol. 41, pp. 909-996, 1988.
International Search Report for Patent Cooperation Treaty Appln. No. PCT/US2007/019034 issued Apr. 8, 2008, 2pgs.
Written Opinion for Patent Cooperation Treaty Appln. No. PCT/US2007/019034 completed Mar. 31, 2008, mailed Apr. 8, 2008, 7pgs.
Non-Final Rejection for U.S. Appl. No. 11/470,611, mailed on Jun. 30, 2008, 5 pgs.
Non-Final Rejection for U.S. Appl. No. 11/422,316, mailed on Jul. 3, 2008, 7 pgs.
Choog Soo Park et al., "Lost Motion Vector Recovery Algorithm," Circuits and Systems, IEEE International Symposium on London, vol. 3, 1994, pp. 229-232.
International Search Report for Appln. No. PCT/US2008/002179, issued Aug. 20, 2008, 12 pgs.
Non-Final Office Action for U.S. Appl. No. 11/255,090, dated Dec. 15, 2008, 15 pgs.
International Search Report and Written Opinion for Appln. No. PCT/US2008/002101, dated Dec. 12, 2008, 13 pgs.
Cotter et al., "Application of Tree-Based Searches to Matching Pursuit," 2001 IEEE International Conference on Acoustics, Speech and Signal Processing, New York, NY, vol. 6, 7, May 2001, pp. 3933-3936.
Shoa et al., "Tree Structure Search for Matching Pursuit," Image Processing, 2005, vol. 3, 11, pp. 908-911.
Qiangsheng Liu et al., "A low-cost video encoder with matching pursuit," Intelligent Multimedia, Video and Speech Processing, May 2, 2001, pp. 502-505.
Yuan Yuan et al., "Improved Matching Pursuits Image Coding," Acoustics, Speech, and Signal Processing, 2005, vol. 2, 18, pp. 201-204.
International Search Report and Written Opinion for Appln. No. PCT/US2008/002100, dated Dec. 12, 2008, 14 pgs.
International Search Report for Appln. No. PCT/US2007/021302, dated Dec. 10, 2008, 5 pgs.
Haoxing Zhang et al., "A Hybrid Video Coder Based on H.264 with Matching Pursuits," Acoustics, Speech and Signal Processing, 2006, p. 889.

Yuan et al., "3D Wavelet Video Coding with Replicated Matching Pursuits," Sep. 11, 2005, Image Processing, pp. 69-72.

Monro et al., "Subband Adaptive Dictionaries for Wavelet/Matching Pursuits Image Coding," Oct. 8, 2006, Image Processing, p. 2136.

Chien-Kai et al., "Matching Pursuits Low Bit Rate Video Coding with Codebooks Adaptation," Jun. 5, 2000, Acoustics, Speech, and Signal Processing, pp. 408-411.

International Search Report for Appln. No. PCT/US2007/021303, dated Dec. 12, 2008, 5 pgs.

Rabiee et al., "Scalable Subband Image Coding with Segmented Orthogonal Matching Pursuit," Oct. 4, 1998, Image Processing, pp. 774-777.

Rabiee et al., "Low-bit-rate Subband Image Coding with Matching Pursuits," Visual Communications and Image Processing, vol. 3309, 1998, pp. 875-880.

Schmid-Saugeon et al., "Dictionary Design for Matching Pursuit and Application to Motion-Compensated Video Coding," 2004, IEEE Transactions on Circuits and Systems for Video Technology, pp. 880-886.

International Search Report for Appln. No. PCT/US2007/019297, dated Dec. 12, 2008, 5 pgs.

Non-Final Office Action for U.S. Appl. No. 11/422,316, mailed Dec. 4, 2008, 13 pgs.

Non-Final Office Action for U.S. Appl. No. 11/332,777, mailed Feb. 25, 2009, 6 pgs.

Final Office Action for U.S. Appl. No. 11/425,142, mailed Mar. 2, 2009, 18 pgs.

International Search Report for Appln. No. PCT/US2007/014181 issued Jan. 23, 2008, 1 pg.

David Salomon, "Data Compression: The Complete Reference," 1998, Springer, XP002464409, pp. 32-33.

Non-Final Office Action for U.S. Appl. No. 11/677,515, mailed Feb. 25, 2009, 21 pgs.

Final Office Action for U.S. Appl. No. 11/677,515, mailed Jul. 2, 2009, 29 pgs.

* cited by examiner

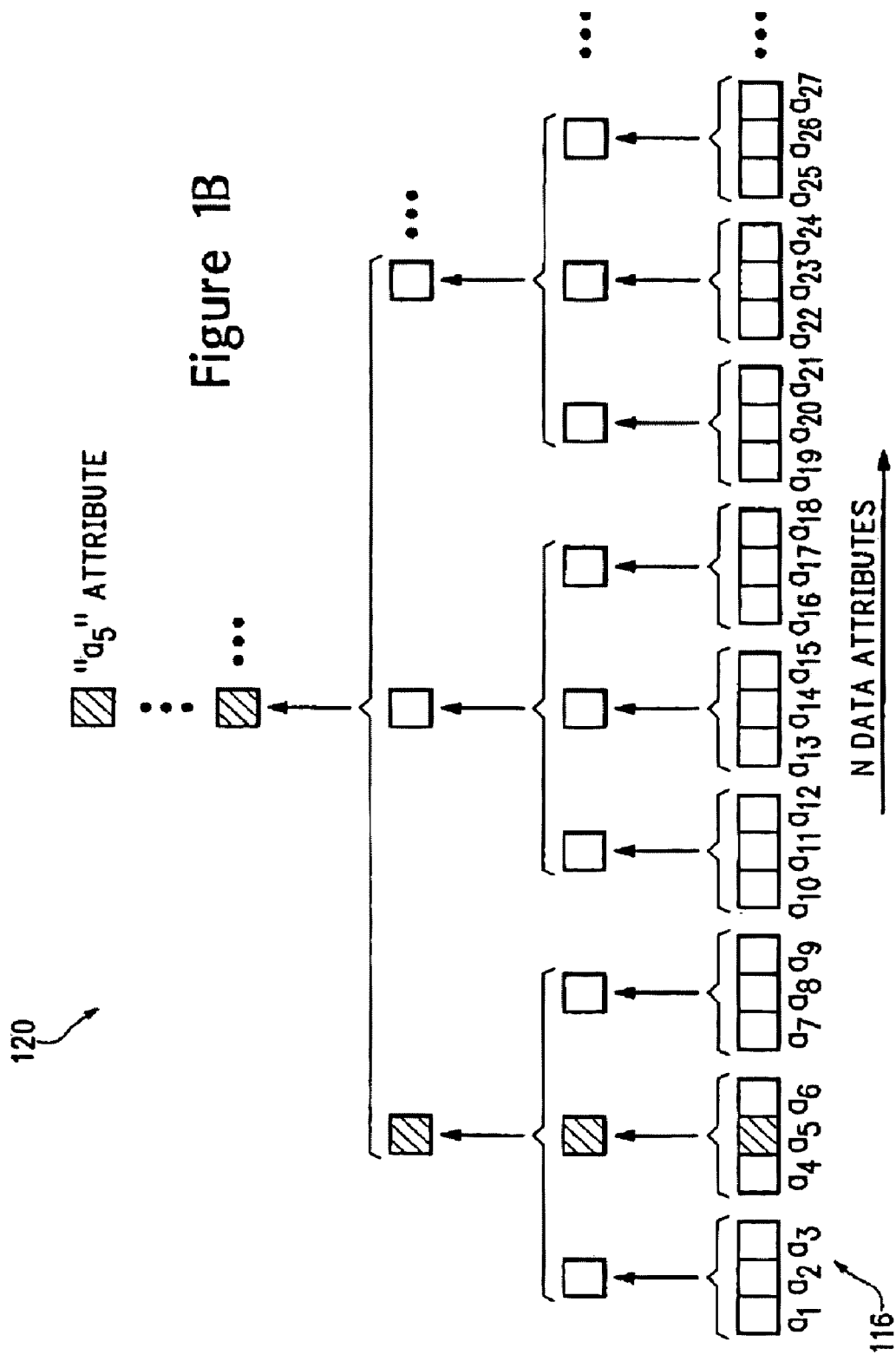

US 7,707,213 B2

HIERARCHICAL UPDATE SCHEME FOR EXTREMUM LOCATION

BACKGROUND

The task of finding an extremum or extreme value (e.g., a maximum and/or minimum data value) of a data set is commonly undertaken using computing systems. For example, system performance may be evaluated by calculating a cost function over the ranges of P parameters yielding a P-dimensional data set of cost function values to be searched. It may be necessary to search the entire resulting data set at least once to find a desired number of extrema. If, however, one or more data values subsequently change, the entire data set may need to be searched again to find any new extrema.

Some applications, for example, some video encoding schemes, involve searching large data sets for extrema. Such data sets may be subject to repeated, sparse updating of the data values. Repeatedly searching the entirety of such updated data sets for new extrema wastes computing resources and may be too slow for many applications.

BRIEF DESCRIPTION OF THE DRAWINGS

Subject matter is particularly pointed out and distinctly claimed in the concluding portion of the specification. Claimed subject matter, however, both as to organization and method of operation, together with objects and features thereof, may best be understood by reference of the following detailed description if read with the accompanying drawings in which:

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the following detailed description are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical, magnetic and/or electromagnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

Figure 1A:
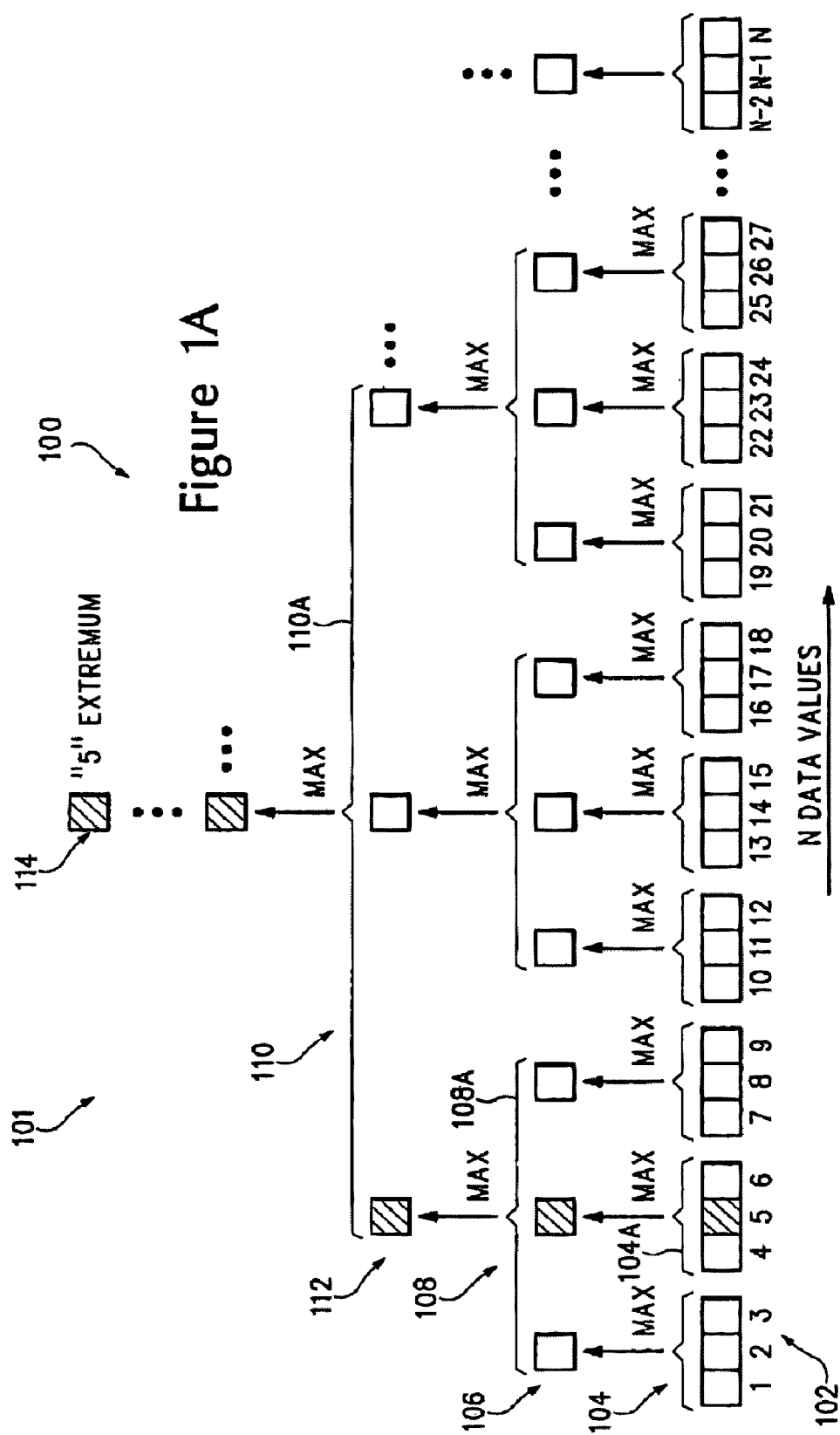
FIGS. 1A-3B are conceptualizations of a hierarchical data structure schemes.
Figure 1C:
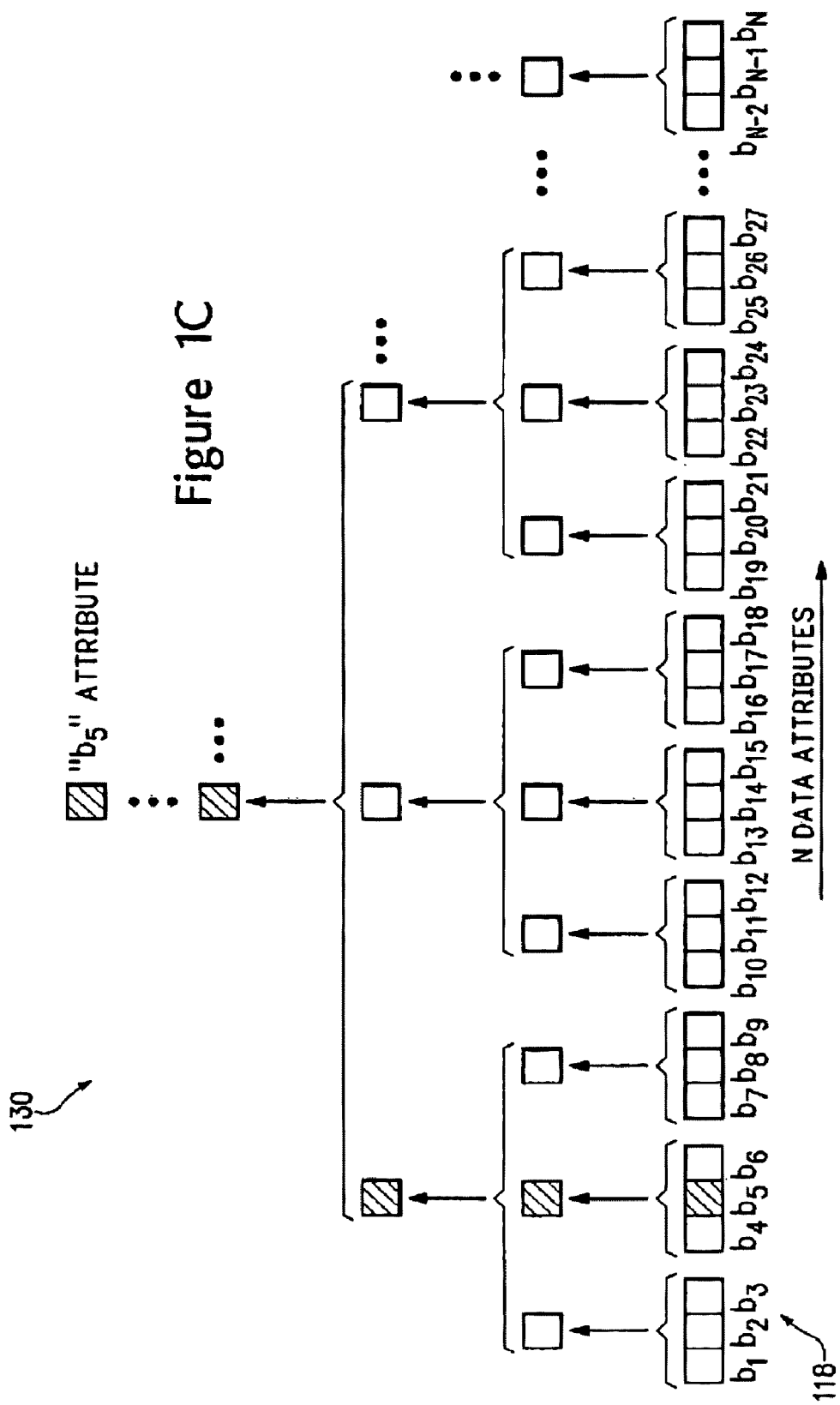

FIGS. 1A-1C depict an example scheme 100. Scheme 100 is presented for explanatory purposes and no arrangement, structure and/or illustration of any quantities and/or elements in FIGS. 1A-1C should necessarily be construed to limit claimed subject matter in any way.

In scheme 100, a data value hierarchy and/or hierarchical data structure 101 includes, at its base, a one-dimensional (1D) list and/or data set 102 of N data values (labeled 1, 2, 3 ... N) divided into partitions 104 having a dimension and/or size S of three data values. Claimed subject matter is not, however, limited in scope to any specific partition size. Data set 102 may also be referred to as a base level of structure 101, as base level data and/or a base level data set.

To begin populating structure 101, a total of (S−1), or two, comparisons may be made among data values in each partition 104, and subsequently identified extreme data values in partitions 104 may be carried into partitions 108 of a first level data set 106 in structure 101. Thus, for example, if set 102 includes fifty-four data values divided into eighteen partitions 104, then a total of thirty-six comparisons may suffice to determine all extrema of partitions 104. In various implementations, extrema in level 106 may comprise largest positive values, largest negative values, or largest absolute values of partitions 104. Claimed subject matter is not limited in this regard, however, and data values of level 106 may comprise, for example, lowest magnitude or smallest absolute values of partitions 104. Throughout this description and/or in the claims that follow, the phrases "carried into", "abstracted to", "be used to populate", and/or "be placed in" may all be used to describe movement of extrema from partitions of a lower level in a hierarchical data structure to a next higher level of that structure. Also, throughout this description and/or in the claims that follow, the term "extremum" and its plural form "extrema" may be used interchangeably with the respective phrases "extreme data value" and "extreme data values."

Like partitions 104, partitions 108 of level 106 may hold three data values each. Hence, in this example, each partition 108 holds three extrema taken from three corresponding partitions 104. To populate a second level data set 112 of structure 101, a total of (S−1), or two, comparisons of data values of each partition 108 may be undertaken, and subsequently identified extreme data values of partitions 108 may be placed in partitions 110 of level 112. Thus, for example, if level 106 comprises eighteen values divided into six partitions 108, then a total of twelve comparisons may be used to determine all extrema of partitions 108.

First level 106 may be described as a coarse representation of extrema of the base level partitions 104, while second level 112 may be considered a coarse representation of extrema of the first level partitions 108. In this sense, upper levels of structure 101 may be described as successively coarser representations of extrema where each successive level 106, 112, etc., may be formed by finding and storing extrema of a previous level's partitions. Hence, a hierarchical data structure in accordance with claimed subject matter may be described as a hierarchy of successively coarser representations comprising a hierarchy of arrays and/or a tree.

In general, for a base level of N data values and for single values of S, a number of levels L in a data structure in accordance with some implementations of claimed subject matter may be provided by $$L = \log_S(N) \tag{1}$$

Value L may comprise an integer if N comprises a power of S. For example, referring to structure 101 (S equal three), a number of data levels may be equal to $\log_3(N)$. Thus, for twenty-seven base level values, structure 101 may have three levels in a scheme with a single partition size of three. While for eighty-one base level values, structure 101 may have four levels in a scheme with a single partition size of three.

Claimed subject matter is not, however, limited to data structures having a specific number of levels and, thus, data structures in accordance with claimed subject matter may include as many levels as desired. For example, for a given number of data values N, there may be a certain number of data levels, not depicted in FIG. 1A, between second level 112 and a top level or apex 114 of structure 101.

It may be recognized that, in accordance with equation (1), for some combinations of N and S, a number of levels L in a data structure in accordance with some implementations of claimed subject matter may have non-integer values. In particular, if N does not comprise a power of S, L may not comprise an integer value and a next higher number of levels may be required to build a structure with a single apex. Thus, in some schemes, a penultimate level (e.g., the data level below the apex) may not include a total of S data values. However, claimed subject matter is not limited to full hierarchical data structures having a number of levels consistent with equation (1). Thus, for example, in some implementations of claimed subject matter, data structures may be employed having less levels than would be consistent with equation (1). In addition, while FIG. 1A may illustrate a pyramidal data structure having same sized partitions in each level in accordance with some implementations of claimed subject matter, claimed subject matter is not limited in this regard and data structures with levels having different sized partitions SL may be employed in accordance with other implementations. Moreover, in accordance with some implementations of claimed subject matter, partitions within a level may be differently sized (e.g., may hold different numbers of data values).

Apex 114 of structure 101 may contain an extremum of base level 102. Overall, a total of (N−1) comparisons may be undertaken to initially populate a pyramidal data structure such as structure 101 with extrema. For example, for a set 102 of fifty-four data values, a total of fifty-three comparisons made among those values may be used to populate apex 114 with an extremum of set 102. Similarly fifty-two comparisons may be used to populate apex 114 for a base level set having fifty-three values, fifty-one comparisons may be used to populate apex 114 for a base level set having fifty-two values, and so forth.

In some cases, for example, with a sufficiently large data value set, an extremum of the data may not be unique (i.e., a set may contain multiple identical extreme data values or extrema). In other words, a base level of a data structure in accordance with claimed subject matter may contain multiple extremum data values. Thus, in various implementations, it may be valid to carry any one of a plurality of extreme data values up to an apex of a data structure, to carry a specific one of the extreme data values (e.g., first, last, or using some other criteria for selecting a value to carry) up to an apex, or to carry all such extreme data values up to an apex of a data structure.

In accordance with some implementations of claimed subject matter, each data value of a base level set may be associated with one or more attributes. For example, as shown in FIGS. 1B and 1C, two attribute sets are shown: a first set 116 of N attributes ($a_1, a_2, \ldots a_N$) and a second set 118 of N attributes ($b_1, b_2, \ldots b_N$). Any given $k^{th}$ pair ($a_k, b_k$) of attributes in attribute sets 116 and 118 is associated with a data value of set 102. In accordance with some implementations of claimed subject matter, parallel hierarchical attribute data structures may be employed to hold those attributes. For example, scheme 100 includes parallel attribute data structures 120 and 130, respectively, for sets 116 and 118, where, for a data value populating levels 102, 106, or 112 of structure 101, an attribute of a corresponding pair of attributes has been carried into like levels of structure 120 and the other attribute into like levels of structure 130.

Claimed subject matter is not limited to any particular type and/or number of attributes and two attributes sets are shown in FIGS. 1B and 1C simply to illustrate the principle. Attributes in accordance with some implementations of claimed subject matter may include a position or location of an extremum in a base level data set and/or other attributes of data such as, in the case of video data, a color or a dictionary entry for an associated basis function to name a few examples.

If one or more data values in a base level data set change, then, by employing a data structure in accordance with some implementations of claimed subject matter, effort required to identify any new extremum in a data set may be limited to making comparisons among data values in only those partitions affected by changed data value(s). For example, if a data value labeled "5" (shown hatched in FIG. 1A) of set 102 changes, then comparisons among data values of a partition 104A holding value 5 may be undertaken to see if partition 104A contains a new extreme data value.

If no other data values change in set 102 then only comparisons within partition 104A of structure 101 may need to be undertaken at base level 102. Thus, in accordance with some implementations of claimed subject matter, a total of (S−1), or two, comparisons of data values of partition 104A would suffice to determine that partition's new extreme data value if any. Any new extreme data value may then be carried into a corresponding partition 108A of level 106. Likewise, (S−1), or two, comparisons of data values of newly updated partition 108A may then be undertaken to determine if a corresponding partition 110A of level 112 needs to be updated and so on. Thus, similar in manner to how structure 101 was initially populated as described above, and in accordance with some implementations of claimed subject matter, structure 101 may be subsequently updated with new extrema in any and/or all upper level partitions impacted by new extrema appearing in any of partitions 104. For example, if changing one or more data values results in a data value "5" becoming a new extremum of set 102, then that value may be propagated into apex 114 as shown in FIG. 1A displacing an old extremum value.

If, on the other hand, carrying an updated extremum from partition 104A into partition 108A does not change that partition's extremum then, in accordance with some implementations of claimed subject matter, updating of structure 101 may end and, hence, an extreme data value in apex 114 may remain unchanged and/or no additional comparisons may be needed. If, on the other hand, an extremum of partition 108A does change, then an extremum value of partition 110A may change as well and additional comparisons may be carried out.

In general, for N base level data values, a number of comparisons C undertaken to update and/or rebuild a pyramidal data structure when one base level data value changes may, in accordance with some implementations of claimed subject matter, be provided by $$C = (S-1)\log_S(N) = (S-1)L \qquad (2)$$

where S and L are, again, partition size and number of levels in a pyramidal data structure. In accordance with some implementations of claimed subject matter, if data values change in more than one base level partition, then a data structure may be updated or rebuilt in a similar manner above all partitions having a changed value.

While it may be convenient to choose values of N and S such that N comprises a power of S, claimed subject matter is not limited in this regard. Further, while a binary hierarchy and/or data structure having a partition size of two may minimize a number of comparisons required to populate or update a structure, claimed subject matter is not limited to specific partition sizes. Thus, for example, for a given set size N, larger values of S may be chosen in order to provide data structures having smaller values of L.

In accordance with some implementations of claimed subject matter, whenever a hierarchical data structure, such as structure 101, is updated, attributes associated with updated data values may be likewise updated in corresponding attribute data structure(s). Thus, for example, for any new extreme data value propagated into partitions 108 and/or 110 of scheme 100, associated attributes of that data value may be propagated into corresponding partitions of attribute data structures 120 and 130 of scheme 100.

Although data structure 101 has been described as a full data structure having a numbers of levels L in accordance with equation (1), in other implementations of claimed subject matter, truncated hierarchical data structures having fewer levels may be employed. In such data structures, a top level or apex may contain multiple extreme data values comprising extrema of a penultimate layer's partitions. In yet other implementations, when, for example, equation (1) provides non-integer values of L, data structures may include a number of levels consistent with a next higher integer value of L.

Figure 2A:
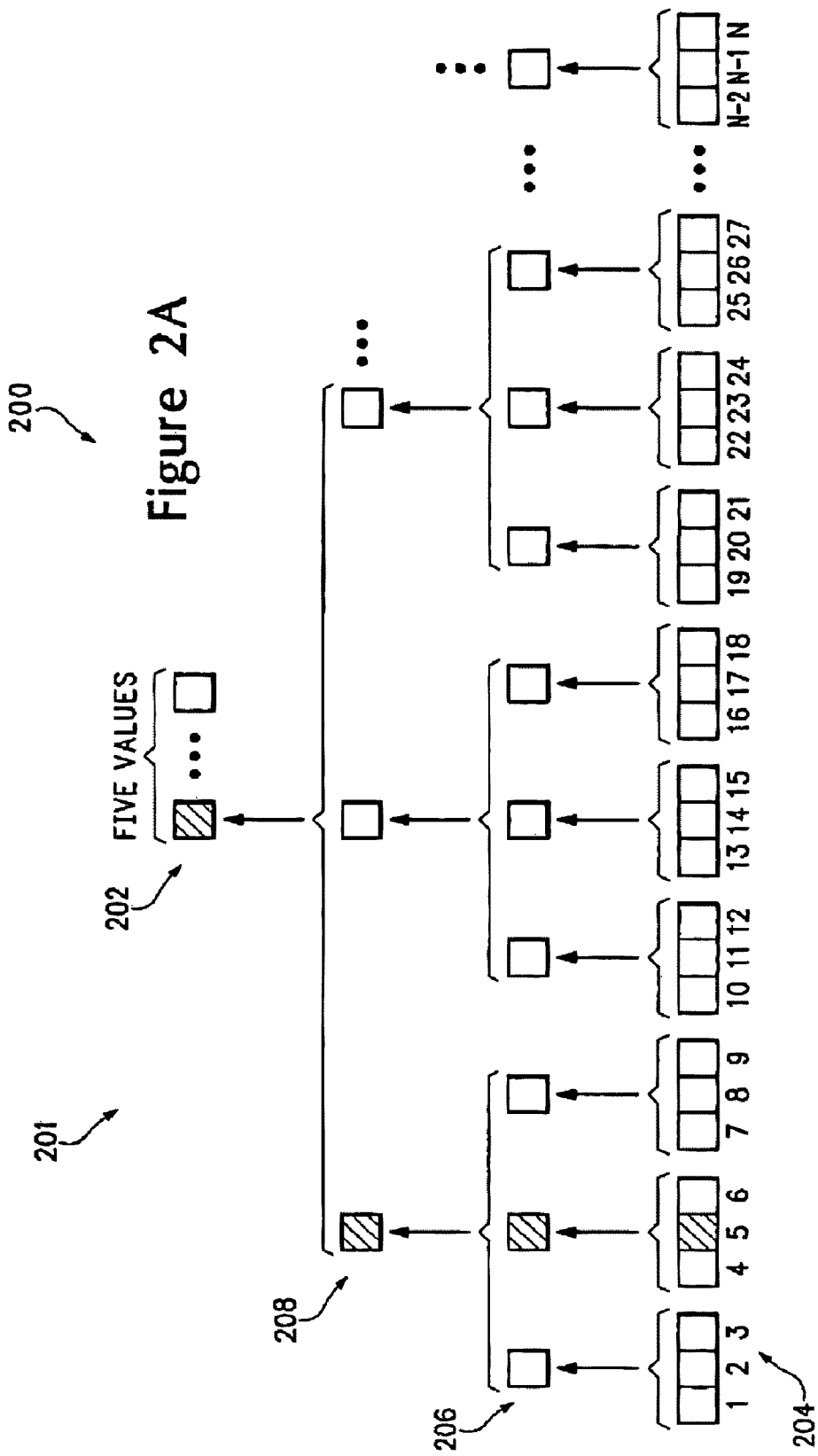
Figure 2B:
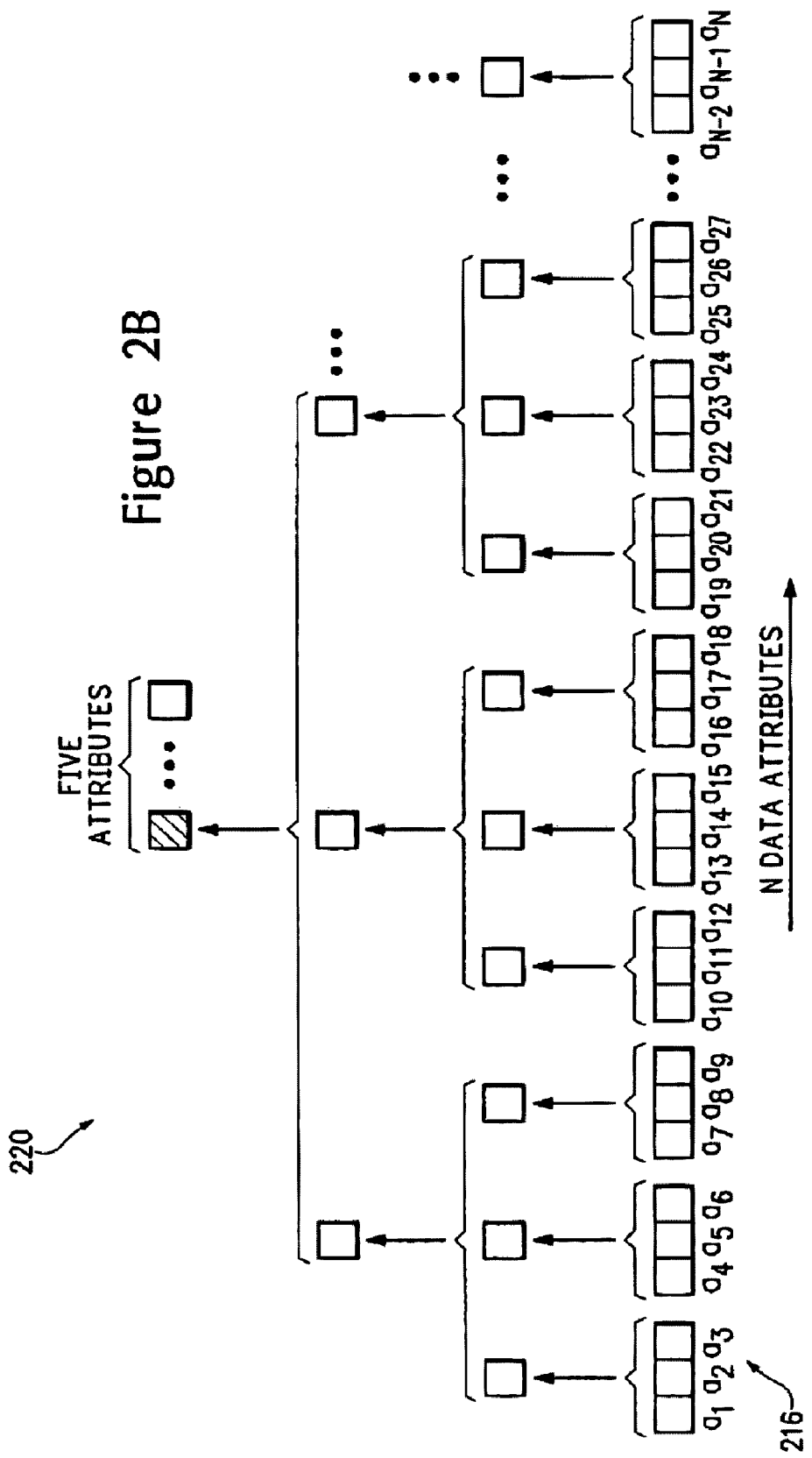

FIGS. 2A and 2B are diagrams depicting an example truncated hierarchical data scheme 200. Scheme 200 is presented for explanatory purposes and no arrangement, structure and/or illustration of any quantities and/or elements in FIGS. 2A/B should necessarily be construed to limit claimed subject matter in any way.

As shown in FIG. 2A, a highest level 202 of a truncated data structure 201 contains extrema derived from a base level 204 of data values (labeled 1, 2, 3 . . . N) and carried up through first and second levels numbered 206 and 208 respectively. In structure 201, each of levels 204 and 206 have partition sizes of three, while a penultimate level 208 has, in this example, a partition size of five. Because top level 202 of structure 201 contains more than one extreme data value, structure 201 may, in contrast to structure 101, provide a list or set of extrema rather than a single extremum. However, implementations in accordance with claimed subject matter may employ various combinations of hierarchical data structures having various partition sizes and numbers of levels and data structures described herein represent only a small subset of possible hierarchical data structures in accordance with claimed subject matter.

As with scheme 100 of FIG. 1A, each of N data values in base level data set 204 of scheme 200 may be associated with one or more attributes. For example, in FIG. 2B, a single attribute set 216 of N attributes $(a_1, a_2, \ldots a_N)$ is shown where any one of attributes (a1, a2, . . . aN) is associated with a single data value of set 204. Thus, in accordance with some implementations of claimed subject matter, a parallel attribute data structure 220 may be constructed for attribute set 216, where, for a data value populating one of levels 204-208 of structure 201, an associated attribute may be carried into like levels of structure 220. Again, claimed subject matter is not limited to any particular type and/or number of attributes and one set of attributes is shown in FIG. 2B simply to illustrate the principle.

Figure 3A:
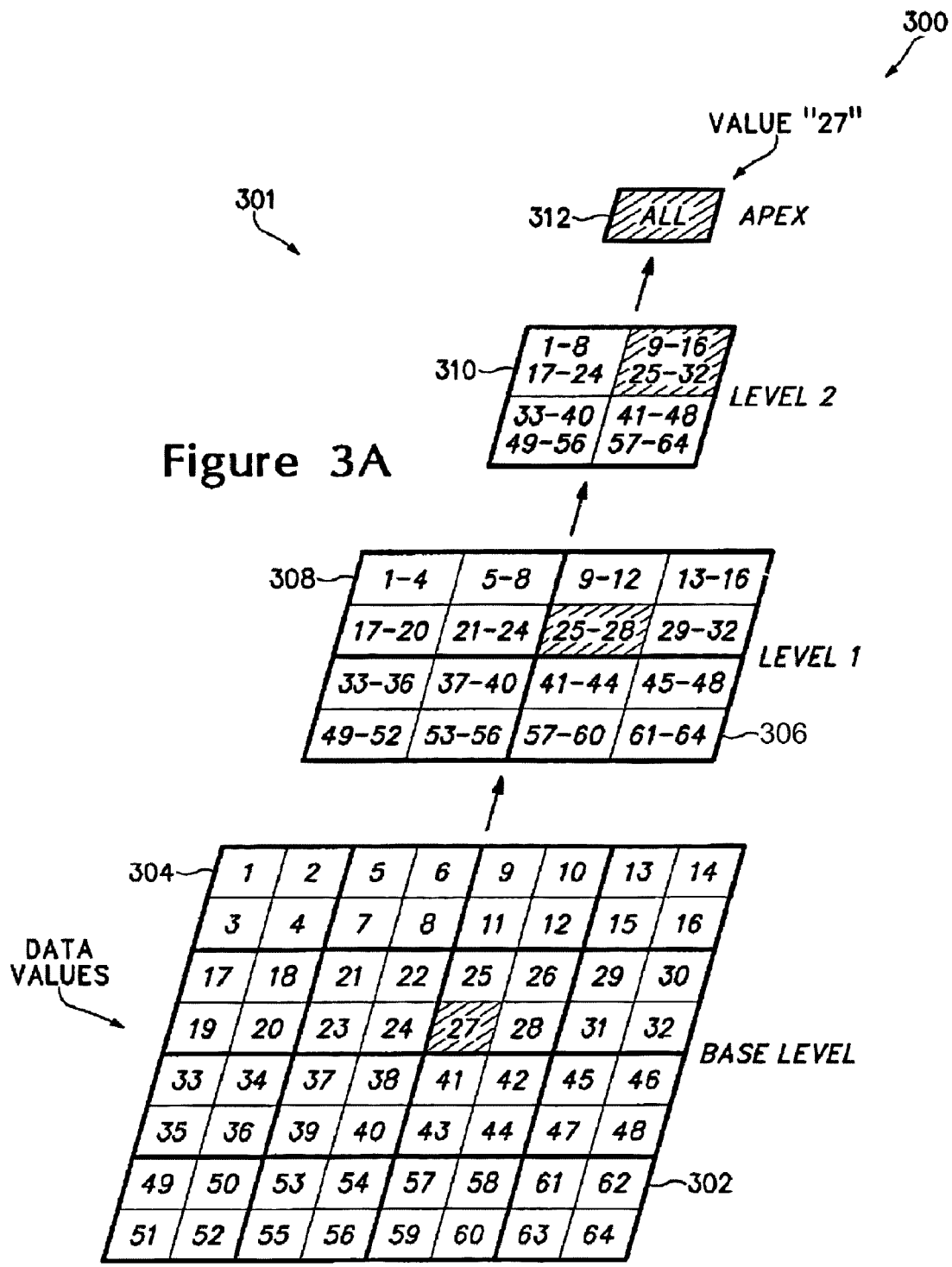
Figure 3B:
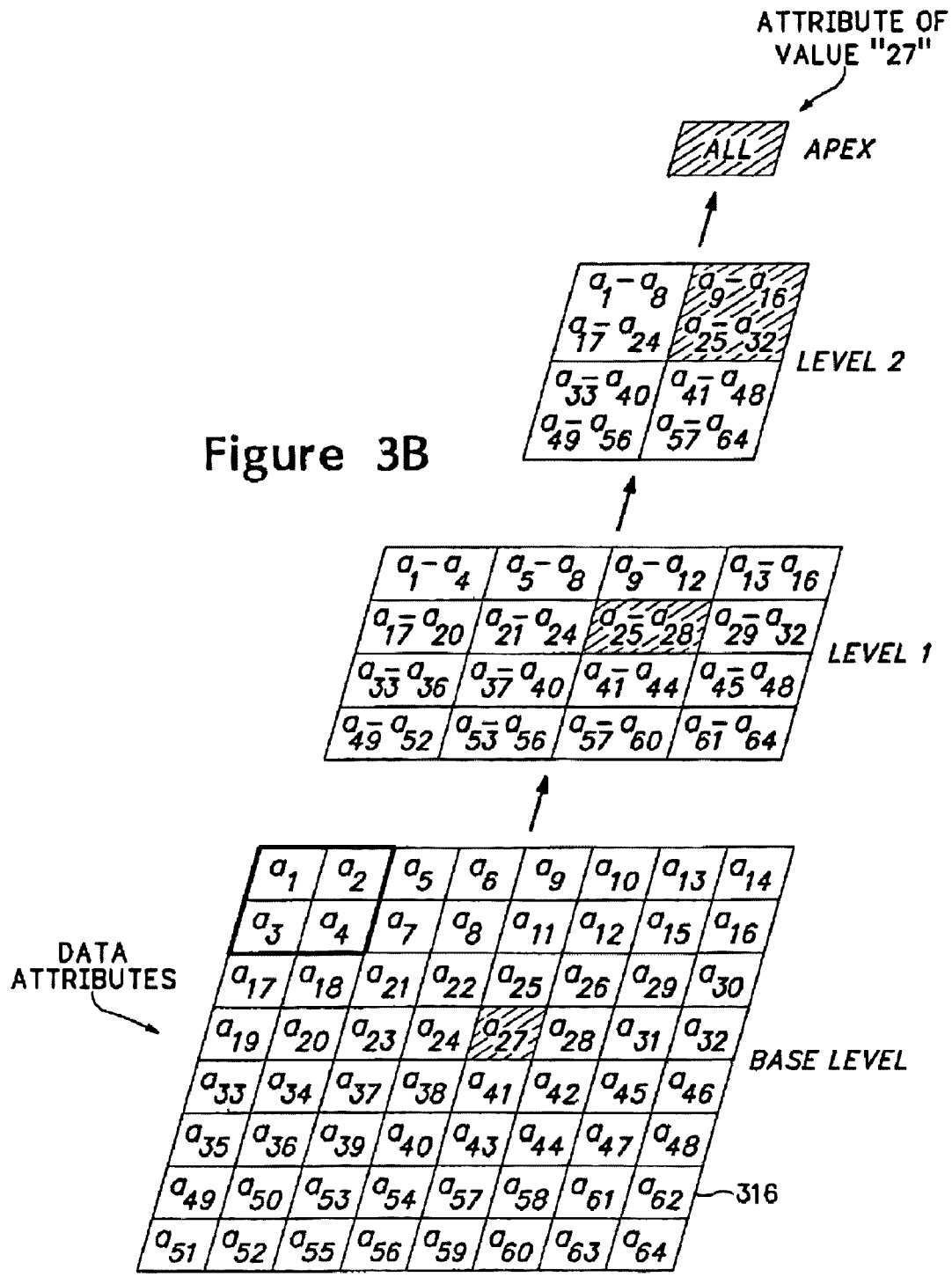

FIGS. 3A and 3B are diagrams depicting an example scheme 300. Scheme 300 is presented for explanatory purposes and no arrangement, structure and/or illustration of any quantities and/or elements in FIGS. 3A/B should necessarily be construed to limit claimed subject matter in any way.

Scheme 300, includes a two-dimensional (2D) data structure 301 having a 2D base level set 302 of sixty-four data values (labeled 1-64) divided into sixteen two-by-two partitions 304 of four data values each. Upper levels of data structure 301 comprise a first level 306 holding a total of sixteen extrema in four two-by-two partitions 308, a penultimate or second level 310 comprising a single partition holding four extrema, and an apex 312 holding the extremum of set 302.

While set 302 as shown comprises a regular rectangular array, claimed subject matter is not limited in this regard and base level sets having any number of data values arranged or grouped in any manner may be employed. Further, while set 302 is a shown as a 2D set, and sets 102/202 of schemes 100/200 as 1D sets, claimed subject matter is not limited to base level sets of any particular dimensionality. Thus, for example, three-dimensional (3D) data structures in accordance with some implementations of claimed subject matter may be built above 3D base data sets.

Further, partitions may include any number of values and/ or may have any shape. Thus, while partitions of structure 301 are shown having a two-by-two rectangular shape, partitions in accordance with claimed subject matter may be non-rectangular and/or may contain more or less than four values.

To build structure 301, extreme data values of each of partitions 304 may be carried into a separate one of four two-by-two partitions 308 of first level 306. To populate partitions 308 a total of (S−1), or three, comparisons may be made among data values of each partition 304. Thus, as shown in FIG. 3A, each partition 308 contains four extreme data values determined from among a corresponding four partitions 304 of set 302. Three comparisons may then be made among values in each partition 308 to establish the extrema of level 306 which may then be carried into second level 310.

Finally, three, comparisons among values of level 310 may establish an extremum of level 310, and hence of set 302, which may then be carried into apex 312 of structure 301. Thus, if, for example, a 27th data value comprises an extremum of set 302, then, in accordance with some implementations of claimed subject matter, this 27th data value may be propagated to apex 312 by undertaking a total of sixty-three comparisons: three comparisons for each of sixteen partitions 304 to populate level 306, three comparisons for each of four partitions 308 to populate level 310, and, finally, three comparisons of data values of levels 310 to provide the extremum value in apex 312. Hatched boxes in FIG. 3A illustrate propagation of this extremum through data structure 301 to apex 312.

As with schemes 100 and 200, a data value in structure 301 may be associated with one or more attributes. For example, in FIG. 3B, one attribute set 316 of attributes ($a_1, a_2, \ldots a$) is shown, where a given $k^{th}$ attribute in set 316 may be associated with a data value of set 302. Thus, as shown in FIG. 3B, and in accordance with some implementations of claimed subject matter, a parallel hierarchical attribute data structure 320 may be constructed, respectively, for or over set 316, where, for a data value carried into levels 302, 306 and/or 310 of structure 301, .an associated attribute may be carried into like levels of structure 320. Again, claimed subject matter is not limited in scope to any particular type and/or number of attributes and one set of attributes is shown in FIG. 3B simply to illustrate the principle.

If one or more data values in base level 302 change, then updating of structure 301 may proceed in a manner similar to that described above with respect to schemes 100 and/or 200. Thus, if changing a data value results in a new extreme data value for set 302, then that extremum may be carried all the way to apex 312 of structure 301 using a total of nine comparisons consistent with equation (2) with a partition size of four. As described above with respect to schemes 100 and 200, and in accordance with some implementations of claimed subject matter, updating of structure 301 may be carried out in full, or updating may be terminated at a particular level if updating that level does not result in a new extremum or if a list of multiple extrema is sought.

While data structure 301 may allow for nine comparisons to achieve full updating for a single changed value, other schemes having ID data structures similar, for example, to scheme 100 of FIG. 1A, may be employed in accordance with some implementations of claimed subject matter to reduce a number of comparisons needed to determine a new extremum. For example, if values of 2D set 302 were to be transformed into a 1 D set and a 1 D data structure having S=2 built over the 1D set, then this 1D data structure may be fully updated using only six comparisons after a single value changes.

If, however, two values change, for example, values labeled "26" and "27" in set 302, then, depending on how 2D set 302 was transformed, for example by scanning in some order, to generate a 1D base level set, values 26 and 27 might be in different partitions so that updating a 1D data structure of S=2 might require two partitions to be updated each requiring six comparisons, or twelve comparisons total. On the other hand, if the same two changes occur in scheme 300, where both changed values 26 and 27 occupy a same partition 304, then only one stage of updating may be required using, again, only nine comparisons. Clearly, there may be many ways, in accordance with claimed subject matter, to optimize how data may be organized in a base level set and/or how a hierarchical data structure may be organized overall in order to reduce the number of comparisons and/or stages of updating required, claimed subject matter not being limited in scope to any particular ordering of a base level set and/or hierarchical data structure.

In accordance with some implementations of claimed subject matter, a base level data set may comprise data representative of image data, of video data, or of a signal such as an audio signal. Further, a base level data set in accordance with some implementations of claimed subject matter may be 1D, 2D, 3D or of higher dimensionality. In addition, a data structure in accordance with some implementations of claimed subject matter may comprise a hierarchy of arrays, or a tree. Moreover, implementations in accordance with claimed subject matter may employ various combinations of hierarchical data structures having various partition sizes and numbers of levels, and those data structures described herein with respect to FIGS. 1A-3B represent only a small subset of the possible hierarchical data structures or schemes in accordance with claimed subject matter.

Figure 4:
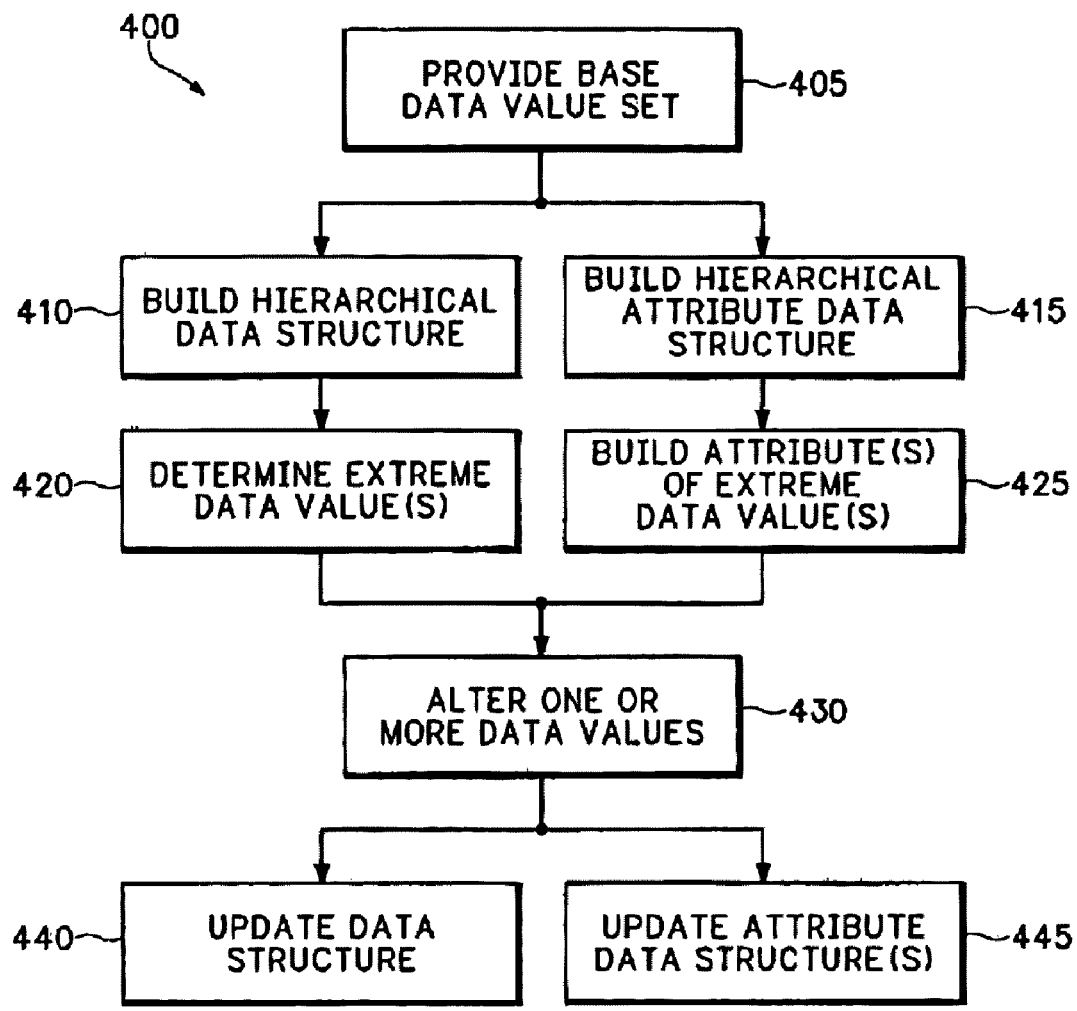
FIG. 4 is a flow diagram of a process for employing a hierarchical data structure.

FIG. 4 is a flow diagram of a process 400 for employing a hierarchical data structure. In block 405, a base data value set may be provided. In blocks 410 and 415 a hierarchical data structure and one or more hierarchical attribute data structure(s) may, respectively, be created or built. For example, block 410 may involve creating a hierarchical data structure in a manner similar to that described with respect to FIGS. 1A-3B. Block 410 may involve, for example, determining, given N data values in a base set of a particular dimensionality provided in block 405, a number of data levels L and partition size(s) SL for those levels. Data structure levels may then be populated with data values in a manner similar to that described above with respect to FIGS. 1A-3B to complete block 410.

Block 415 may involve creating one or more hierarchical attribute data structures having a same total number of data levels L and partition size(s) SL a data structure created in block 410. Any such hierarchical attribute data structures may then be populated with attributes of data values of a data structure created in block 410 in a manner similar to that described with respect to FIGS. 1A-3B.

In respective blocks 420 and 425, one or more extreme data values and any associated attribute(s) may be determined. In some implementations of claimed subject matter, blocks 420 and 425 may be performed upon completion of respective blocks 410 and 415 when top levels of a data structure and any associated attribute data structure(s) may be populated, respectively, with one or more extreme data values and associated attribute(s), if any.

At block 430, one or more data values may be changed in the base data set received in block 405. Block 430 may involve one or more data values getting larger or smaller. If multiple values change then some of values may increase in magnitude while others decrease in magnitude.

In block 440 the data structure may be updated in response to the value(s) changed in block 430. As described previously with respect to FIGS. 1A-3B, updating a data structure in accordance with some implementations may involve making comparisons among base level partitions holding changed data values, providing associated first level partitions with any new extreme data values of those base level partitions, and then carrying that process forward in a similar manner for some if not all levels of a data structure. At block 445, associated attribute data structure(s) may be updated in a parallel manner as was described previously with respect to FIGS. 1A-3B.

Claimed subject matter is not, however, limited to updating an entire data structure in block 440 and, thus, in some implementations, block 440 may involve updating a data structure only for partitions of those levels above partitions having new extrema. For example, in some implementations, changing one or more data values in block 430 may not result in a new extreme data value in a base data set and, thus, updating of a data structure in block 440 may not be carried through to a highest level and/or apex of a data structure. In other implementations, extrema or multiple extreme data values of a base data set, rather than a single extremum, may be provided. In such implementations, updating in block 440 may be terminated before a highest level and/or apex of a data structure. In accordance with some implementations of claimed subject matter, updating of any associated attribute data structures in block 445 may be carried out to a same extent as that of a data structure in block 440.

Application to Video Encoding

Encoding video data may comprise an application suitable for employing hierarchical data structures in accordance with the claimed subject matter. In some video encoding schemes, algorithms, such as matching pursuits (MP) algorithms, may be employed to transform 2D image data into coded information describing the data in terms of various known signals or basis functions having discrete amplitudes. Claimed subject matter is not, however, limited to video encoding, or to video encoding schemes employing MP processes.

An MP method was first described with respect to coding of raw 1D audio signals. See, for example, S. G. Mallat and Z. Zhang, "Matching pursuits with time-frequency dictionaries", *IEEE Trans. Signal Processing*, vol. 41, pp. 3397-3415, December 1993. MP methods have also been applied in 2D to video coding. See, for example, R. Neff and A. Zakhor, "Very low bit rate video coding based on matching pursuits", *IEEE Trans. Circuits and Systems for Video Tech.*, vol. 7, pp. 158-171, February 1997; and A. Zakhor and R. Neff, Method and apparatus for compression of very low bit rate video signals, U.S. Pat. No. 5,699,121, 16 Dec. 1997.

An MP algorithm may include repeatedly determining, for different locations or positions in a data set, full inner products between data to be coded and members of a dictionary of basis functions, and then identifying basis functions yielding largest inner products at different positions. At any particular position, a dictionary entry of an identified basis function may describe the data locally and may be termed an "Atom." To find a particular Atom, a maximum of absolute values of inner products may need to be identified. Amplitudes of Atoms thus identified may be quantized using one of any number of well-known quantization techniques, claimed subject matter not being limited in scope in this regard. For example, Atom amplitudes may be quantized using a Precision Limited Quantization (PLQ) method (see, for example, D. M. Monro, J-L Aufranc, M. A. Bowers and W Poh, "Visual embedding of wavelet transform coefficients", IEEE Int. Conf. Image Process. (ICIP 2000), September 2000), or some other method.

When initially undertaking an MP process in accordance with some implementations of claimed subject matter, a hierarchical data structure may be created or built over a base level data set comprising absolute values of inner products in a manner similar to that described above with respect to FIGS. 1A-3B In an MP process a base level may comprise extrema determined, at each position, over all basis functions in a dictionary, and it may be necessary to record which dictionary entry is associated with each value in the base level data set. Hence, attributes associated with absolute values of inner products, such as dictionary entries, signs, positions or locations in image data, etc, may be used to initially populate hierarchical attribute data structure(s) in a manner similar to that described above with respect to FIGS. 1A-3B.

Once identified using, at least in part, a data structure in accordance with some implementations of claimed subject matter and quantized, an Atom may be removed or subtracted from associated image data. Removing an Atom from a location in an image data set may change image data in a local region. Inner products may then be recomputed and another position and dictionary entry yielding a maximum absolute value of an inner product may be identified by, at least in part, updating a base level of a data structure and then applying a hierarchical update in accordance with some implementations of claimed subject matter in a subsequent iteration of an MP process. Thus, data may be altered hundreds or thousands of times when coding using MP methods as successive Atoms are identified and removed, and a new search for a maximum absolute inner product may be carried out when identifying each Atom. It may be recognized that results of MP processing may be improved if a maximum of all absolute inner products are determined with each iteration or step of an MP process.

An iteration of an MP process may carry out new inner product calculations only in a locality where the image data has been changed as a result of a previous iteration. This may be termed 'repairing' inner products to those familiar with the field. Having repaired inner products in a locality, a next iteration of an MP method may include examining repaired inner products to determine, at each repaired position, a dictionary entry that provides a maximum absolute value. Doing so may result in a new quantized amplitude and dictionary entry for each repaired position. Newly determined quantized amplitudes may then, in accordance with implementations of claimed subject matter, be used to update a base level of an associated hierarchical data structure. Dictionary entries associated with the newly determined quantized amplitudes may, likewise, be used to update a base level of an associated attribute hierarchical data structure holding dictionary entries. The hierarchical data structure and associated attribute hierarchical data structure(s) may then be updated to locate a next Atom and its attribute(s).

At any particular stage or iteration of an MP process, data being processed may be described by codes of Atoms found up to that stage, and a remaining data residual. However, when identifying and removing an Atom, a subset of inner products values may change in regions that overlap an area where a previous Atom has been subtracted from the image data. This region may be termed a "footprint" of a previous Atom and may span tens of image data pixels.

An MP process may be described in pseudocode as:

---

Initialize compute full set of inner products
Repeat
    Find Atom. Full search or reduced complexity strategy
    Atom Update. Subtract quantized Atom from image
    Repair. Recompute required inner products only in Atom footprint.
Until distortion or bit rate criterion met

---

Claimed subject matter is not, however, limited to a particular MP process such as described by the above pseudocode.

An MP process may be terminated at some stage and codes of a certain number of Atoms stored or transmitted by a further lossless coding process. Atoms used may describe a signal with some loss of information, while any unused Atoms plus a residual complete a signal's description. A lossless coding process employed may, for example, be a MERGE code employing PLQ quantization or some other method. See, for example, Yuan Yuan and Monro, D. M., "Improved Matching Pursuits Image Coding", IEEE International Conference on Acoustics, Speech and Signal Processing ICASSP 2005, Philadelphia, March 2005. Claimed subject matter is not, however, limited in scope to any particular lossless coding process and/or quantization process. A decoder may reconstruct transmitted coded Atoms to form a lossy signal description.

For some implementations, a dictionary of basis functions may comprise 2D bases. Other implementations may employ dictionaries comprising 1D bases that can be combined separably to form 2D bases. A dictionary of n basis functions in one dimension may provide a dictionary of $n^2$ basis functions in two dimensions. In some implementations, 2D data, such as a portion of a frame of video data, may be transformed, for example by scanning in some suitable order, to yield a 1D signal and a 1D dictionary may be applied. In some implementations, a dictionary may comprise a set, group and/or collection of Gabor functions although claimed subject matter is not limited in scope in this regard.

To better understand application of some implementations of claimed subject matter to video encoding, an example MP implementation may be described with reference to scheme 300 although those skilled in the art may recognize that MP encoding may be performed using much larger data sets than set 302.

In some implementations, video data subjected to a MP process may comprise a portion or region of a video frame. In some implementations, video data may comprise a Displaced Frame Difference (DFD) image generated during motion compensation processing of a video frame. As described above, an MP process may include searching a data set comprising absolute values of inner products for new extrema. Thus, for example, set 302 may comprise a set of absolute of inner product values determined for a region of image data. Claimed subject matter is not, however, limited in scope to inner products data or, for that matter, to any particular type of data, MP related video data or otherwise.

Thus, at a position of a maximum inner product value in set 302 identified by an extreme data value of a hierarchical data structure in accordance with some implementations of claimed subject matter, a dictionary entry associated with that maximum inner product may describe video data locally. In this sense, a particular basis function (i.e., a dictionary entry) may be described as an attribute associated with, and/or representing video data associated with a location in set 302. In accordance with some implementations of claimed subject matter, other attributes of a data value may include its position or location in a base level data set. For example, a position of a data value in set 302 may be indicated by a position index, a row and column index, etc. Moreover, in addition to a position or location of a value in the base level data set, an absolute inner product value of base level set, such as set 302 may be associated with attributes such as a dictionary entry of an associated Atom and/or quantized amplitude of an associated Atom. In implementations where data values comprise absolute inner product values, attributes may also comprise a value's sign (e.g., positive or negative valued).

Figure 5:
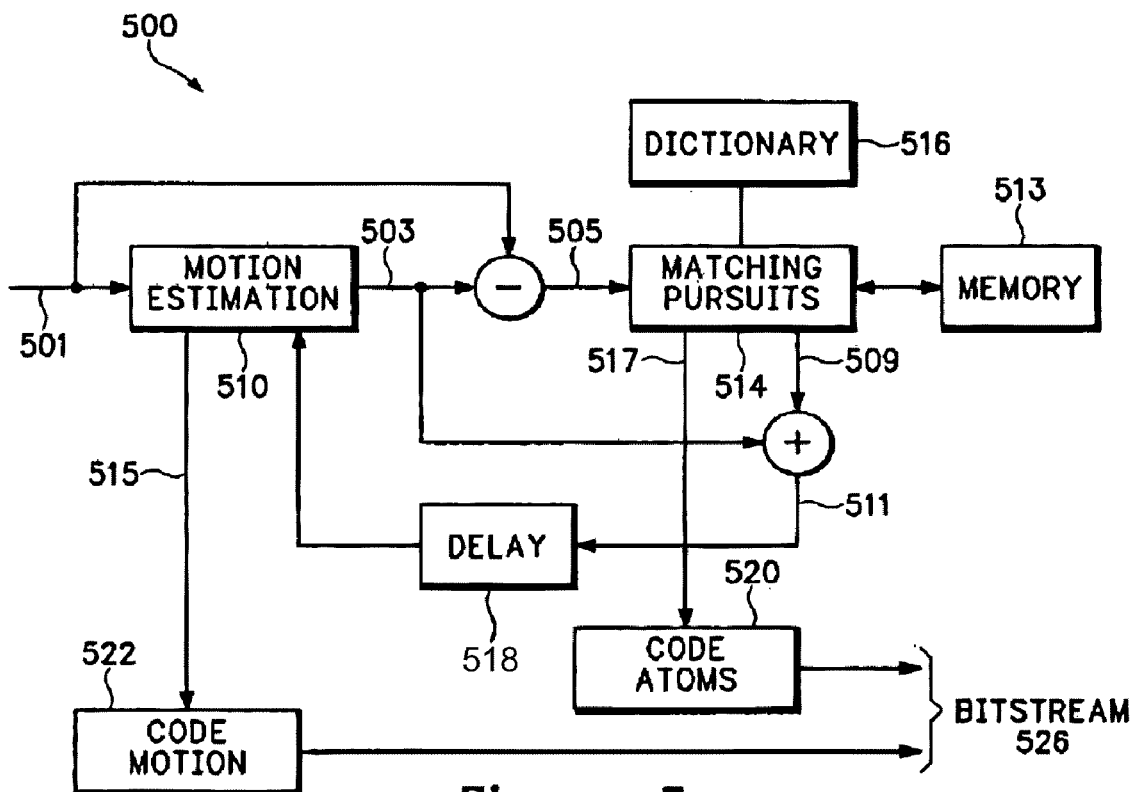
FIG. 5 illustrates an example encoding system.

FIG. 5 is a block diagram of an example video encoder and/or encoding system 500. Encoding system 500 may be included in any of a wide range of electronic devices, including digital cameras or other image forming devices, although claimed subject matter is not limited in this respect. System 500 may receive data 501 for a current original image. For this example implementation, current original image 501 may comprise a frame from a digital video stream or sequence of image frames. A motion estimation block 510 may receive current original image 501 and a reference or previous reconstruction frame 513. Motion estimation block 510 may perform motion compensation on image 501 to produce motion data 515 and prediction data 503. Motion data 515, which may include motion vectors and/or motion vector corrections, may be encoded by a code motion block 522 to produce coded motion data. Claimed subject matter is not limited in scope to any particular motion compensation method and/or any particular method used to encode motion data. Prediction data 503 may be subtracted from current original image data 501 to form an error or DFD image 505.

DFD image 505 may be received at an MP block 514. In some cases, DFD image 505 may be transformed before being provided to MP block 514. For example, DFD image 505 may be wavelet transformed before being provided to MP block 514. Claimed subject matter is not, however, limited to a particular type and/or format of data in general or in particular as provided to MP block 514.

MP block 514 may perform an MP process on DFD image 505 in a manner similar to that described above. In accordance with some implementations of claimed subject matter, MP block 514 may, in the process of MP encoding DFD image 505, use hierarchical data structures (e.g., pyramidal data structures similar to structure 301 of FIG. 3A) to, for example, determine extreme absolute inner, product values as successive Atoms are identified and removed from DFD image 505. In doing so, MP block 514 may store data values of the one or more hierarchical data structures in memory 513 coupled to MP block 514 and/or may access memory 513 to receive extrema and/or to update data values. Memory 513 may comprise any type of memory such as, but not limited to, Dynamic Random Access Memory (DRAM), Static Random Access Memory (SRAM), or the like. Further, in some implementations of claimed subject matter, MP block 514 may employ logic including comparator logic while using a hierarchical data structure to determine extreme inner product values. Those skilled in the art will recognize that comparator logic comprising one or more pyramidal arrays of comparators may be used to undertake comparisons of data values.

Those skilled in the art may recognize that inner product data sets (e.g., inner product data sets derived from DFD image 505 ) may comprise much larger base data sets than are shown in the example of FIG. 3A. Moreover, when identifying extreme inner product values, MP block 514 may also employ one or more separate attribute data structures, similar to structures 320 and 330, holding attributes associated with the new extrema. Attributes populating those data 'structures may also be held in memory 513.

MP block 514 may use a dictionary 516 to construct a series of Atom parameters 517 which may be delivered to a code Atoms block 520. Atom parameters 517 may, for example, comprise one or more of the data attributes held in hierarchical attribute data structures. Code Atoms block 520 may encode the Atom parameters using any of a wide range of encoding techniques, claimed subject matter not being limited in scope in this regard. MP block 514 may also produce a coded residual 509 that may be added to the motion prediction information 503 to form a current reconstruction image 511 corresponding to current image data. Image 511 may be delayed by a delay block 518 before being provided to motion estimation block 510 as a previous reconstruction image 513 to be used in connection with motion estimation operations for a next original image.

Coded Atoms from block 520 and coded motion data from block 522 may be formed into a bitstream 526 that, in turn, may be transmitted to any of a wide range of devices, such as devices incorporating video decoders, using any of a wide range of interconnect technologies, including wireless interconnect technologies, the Internet, local area networks, etc., although claimed subject matter is not limited in this respect.

The various blocks and units of encoding system 500 may be implemented using software, firmware, and/or hardware, or any combination of software, firmware, and hardware. Further, although FIG. 5 depicts an example system having a particular configuration of components, other implementations are possible using other configurations. In addition, while FIG. 5 is directed to a video encoding system, claimed subject matter is not limited to video encoding applications, and, thus, other systems adapted for the encoding of still images or for the encoding of audio signals, to name two examples, may, in accordance with other implementations of claimed subject matter, employ hierarchical data structures holding data values to determine extrema.

Figure 6:
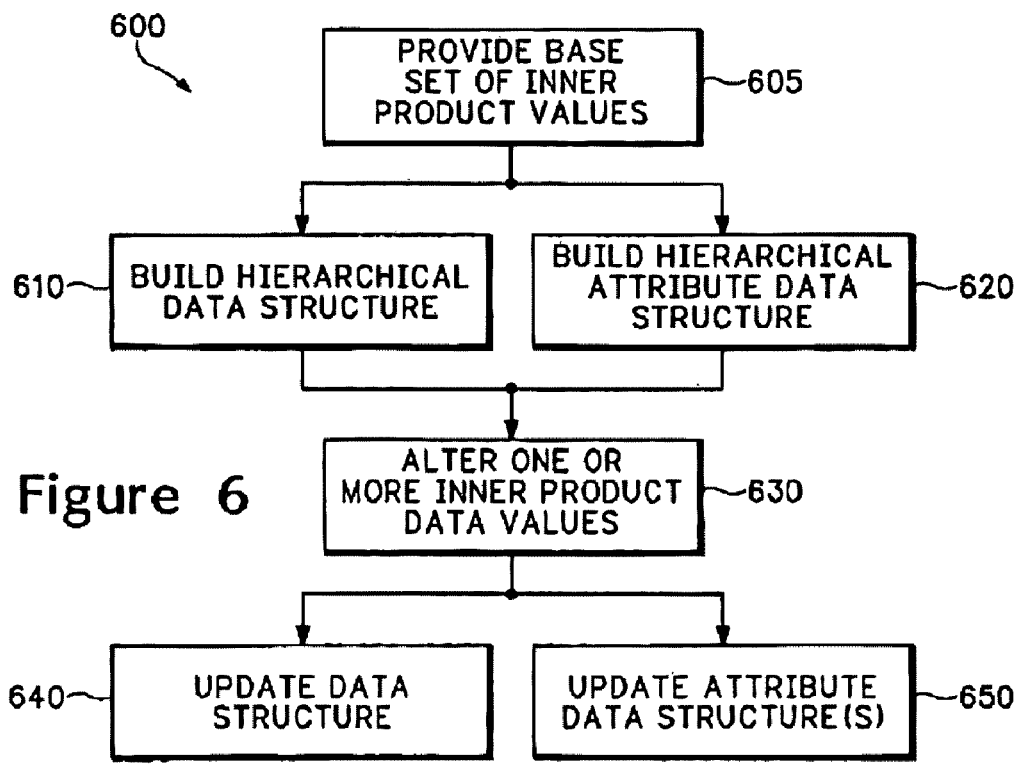
FIG. 6 is a flow diagram of a process for employing a hierarchical data structure for video encoding.

FIG. 6 is a flow diagram of a video coding process 600. In block 605, a base set of video data values may be provided. A data set provided in block 605 may comprise a set similar to set 302 of FIG. 3A and may comprise absolute inner product values determined in an MP process, although claimed subject matter is not limited in this regard. Thus, referring to FIGS. 3A and 5, Block 610 may, for example, involve having MP block 514 employ logic to, in part; determine inner product values over a dictionary of basis functions for a set of image data such as DFD image 505 and then provide absolute values of those inner products as set 302.

At block 610, a hierarchical data structure may be built. For example, referring to FIGS. 3A and 5, block 610 may involve having MP block 514 divide set 302 in partitions 304, determine a number of levels L and associated partition sizes SL, and employ logic to, in part, compare the inner product values within partitions to each other to initially populate a hierarchical data structure with extreme inner product values.

While scheme 300 may provide a useful example, those skilled in the art may recognize that common video data applications may involve much larger data sets than set 302. For example, in television broadcasting, a set of image data may comprise 720 horizontal by 560 vertical rows of pixel data yielding a data set of 414,720 pixel values. MP encoding of such video data may entail searching for extreme data values in a number of inner product data sets each having 414,720 inner product data values derived from those pixel values. Thus, in some implementations, schemes in accordance with claimed subject matter may employ a plurality of data structures each having a base level data set of 414,720 absolute inner product values and each associated with one or more corresponding attribute structures of the same size. However, this is only one example image data set size, there being many possible image data set sizes, and claimed subject matter is not limited to any particular base level data set size whether comprising video data or any other data.

For example, referring also to FIG. 5, in block 610, MP block 514 may build a data structure over a base level of 414,720 absolute inner product values where higher levels of the data structure may be populated with extreme data values by defining partitions within the base level, comparing data values within partitions, and so on as described previously above with respect to FIGS. 1A- 3B. In undertaking block 610, MP block 514 may store data values that populate the data structure(s) in memory 513 .and/or may use comparator logic to undertake comparisons.

In block 620 one or more hierarchical attribute data structures may be built. In some implementations, block 620 may involve: creating one or more hierarchical attribute data structures having the same total number of data levels L and partition size(s) $S_L$ as a data structure created in block 610, and then populating those attribute data structures with attributes of data values that populate a data structure created in block 610.

In accordance with some implementations of claimed subject matter, at least two attribute data structures may be created in block 620 by MP block 514. One of those attribute data structures may be built on a base level comprising the signs of a corresponding 414,720 absolute inner product values of a data structure created in block 610, while another attribute structure may be built on a base level comprising dictionary entries of basis functions associated with those inner product absolute values. In undertaking block 620, MP block 514 may store and/or access values populating the attribute data structure(s) in memory 513.

At block 630, one or more data values may be changed in a base data set of absolute inner product values. For example, block 630 may occur when MP block 514, performing an MP process, subtracts an Atom from image data and repairs affected inner products thereby altering one or more values in the base data set.

Those skilled in the art may recognize that a size of a footprint generated by subtracting an Atom may depend on a size or extent of basis functions employed in an MP process. For example, if a maximum basis size of an MP basis function comprises nine pixel units, then, when an Atom is subtracted from an image, a total of eighty-one pixel values may be altered. However, because of overlap between inner product determinations, inner product values over a larger 17×17 window, or a 289-pixel region, in this example, may change in a base data set when an Atom is removed from image data. Those skilled in the art may further recognize that repairing an affected region may involve calculating new inner product values in that affected region and best matching basis functions may then be determined for each location in a repaired region. Thus, in this example, block 630 may involve changing amplitudes of 289 data values out of 414,720 in a base data set when an Atom is subtracted from image data.

In block 640, the data structure may be updated. As described previously with respect to FIGS. 1A-3B, updating a data structure in accordance with some implementations of claimed subject matter may involve making comparisons among those base level partitions holding changed data values, providing associated partitions of a first level with any new extreme data values of base level partitions, and then carrying that process forward in a similar manner for some if not all levels of a data structure.

For a pyramidal two-dimensional hierarchical data structure having a 2×2 partition size similar to structure 301 but a base set of 414,720 values, a total of ten levels above a base level may need to be updated in block 640 if one or more values change in a base level in block 630. A base level data set may represent an image comprising 720 horizontal by 576 vertical pixels. At each level above the base, a number of partitions may be halved in each direction. Therefore, no more than 10 levels may be required for such an image, since starting from an apex and doubling ten times would produce 1024 by 1024 partitions, which is larger than the base level data set in this example.

Continuing this example, if 289 base level values change in block 630, MP block 514 may need to search eighty-one partitions, out of a total of 103,680 base level partitions, for new extrema. In other words, in block 640, MP block 514 may continue performing a MP process by comparing four data values, which may require three comparison operations, in each of eighty-one base level partitions to determine if any partitions have new extreme data values. Hence, updating eighty-one partitions may require a total of 243 comparisons. If some base level partitions have new extreme data values, then, given a particular data structure used in this example, MP block 514 may need to examine a total of twenty-five of 25,920 first level partitions by using seventy-five comparisons to search for any new extrema on that level. As long as updating a level results in one or more new extreme data values on that level, then updating of a data structure may continue in block 640 with updating of corresponding partitions of a next higher level, etc. If updating a specific level does not result in any new extrema in that level's partitions then updating of a data structure in block 640 may end with that level.

Overall, using this example, if changing 289 base values in block 630 result in a new extreme value in a base level set then, after eighty-one partitions are examined in a base level, twenty-five partitions may be searched at a first level, nine at a second level, four at a third level, and one at each level thereafter yielding a total of 375 comparisons in block 640 to identify a new extreme value in 414,720 total base level values. By comparison, without benefit of claimed subject matter, establishing a new base set extreme value may require a total of (N−1), or 414,719, comparisons.

Again, claimed subject matter is not limited in block 640 to updating an entire data structure and, thus, in some implementations block 640 may involve updating a data structure only for those levels having new extrema. For example, some implementations may occur wherein changing one or more data values in block 630 does not result in a new overall extremum in a base data set and, thus, updating of a data structure in block 640 may not be carried through to a highest level and/or apex of a data structure. In other implementations, a set of extrema or multiple extreme data values may be sought rather than a single extremum. In these implementations, updating in block 640 may also be terminated before a highest level and/or apex of a data structure.

In block 650, an attribute data structure(s) may be updated. As described previously with respect to FIGS. 1A-3B, updating an attribute data structure in accordance with some implementations may involve updating attribute data structure(s) to reflect any changes in an associated data structure. In other words, if, for example, any data values change in partitions of a base level in block 630, and if any of those new values are carried into partitions of a first level in block 640, then attributes of those data values may likewise be carried into like first level partitions of associated attribute data structure(s) by MP block 514 in block 650. Similarly, MP block 514 may continue block 650 by updating upper levels of associated attribute data structure(s) with attributes of any new extreme data values propagated into like levels of a data structure in block 640.

Thus, in accordance with some implementations of claimed subject matter, either initially building data structures in blocks 610 and 620 or updating such structures in block 640 and 650 may result in identification of an extremum inner product value and associated attributes such as a dictionary entry and/or a quantized amplitude of an associated Atom. Attributes may also include a position or location of an inner product value in the base level data set where that location may correspond to a position of an associated Atom in the image data. Attributes may also include a sign value (e.g., positive or negative valued) for base level sets comprising absolute inner product values.

Figure 7:
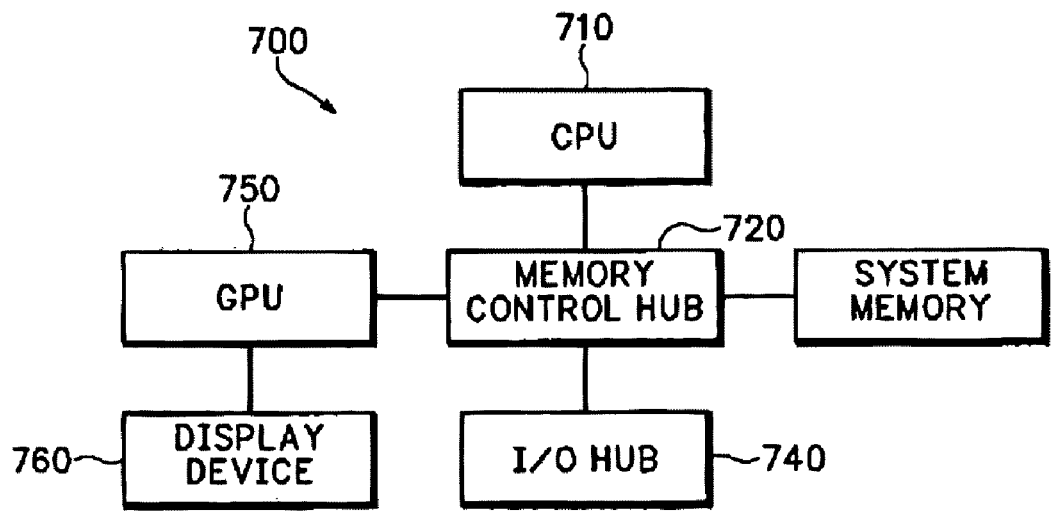
FIGS. 7-8 illustrate example systems.

FIG. 7 is a block diagram of an example computer system 700. System 700 may be used to perform some or all of the various functions discussed above in connection with FIGS. 1A- 3B and 4-6. System 700 includes a central processing unit (CPU) 710 and a memory controller hub 720 coupled to CPU 710. Memory controller hub 720 may further coupled to a system memory 730, to a graphics processing unit (GPU) 750, and to an input/output hub 740. GPU 750 may be further coupled to a display device 760, which may comprise a Cathode Ray Tube (CRT) display, a Liquid Crystal Display (LCD) flat panel display, or other type of display device. Although example system 700 is shown with a particular configuration of components, other implementations are possible using any of a wide range of configurations.

Figure 8:
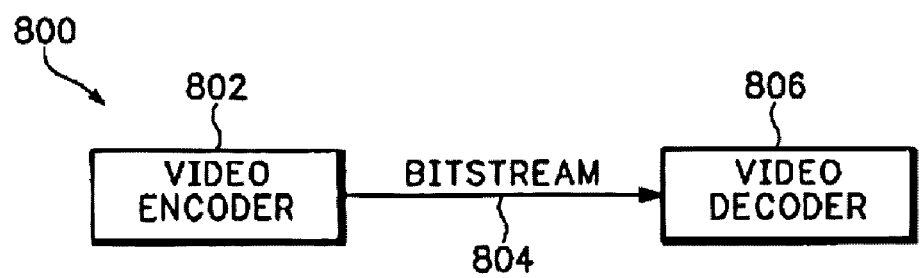

FIG. 8 is a block diagram of an example video transmission system 800. System 800 includes a video encoder 802 (e.g., system 700) that may transmit or convey information 804 (e.g., in a bitstream) to a video decoder 806 (e.g., system 700) where that information includes video data that has been compressed using an encoding process that employs hierarchical data structures in accordance with some implementations of claimed subject matter. For example, encoder 802 may, in accordance with some implementations of claimed subject matter and while employing a MP encoding scheme to generate information 804, use data structures having base data sets of inner product absolute values to determine inner product extrema. Although example system 700 is shown with a particular configuration of components, other implementations are possible using any of a wide range of configurations.

It will, of course, be understood that, although particular implementations have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the implementations previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Also, as used herein, the article "a" includes one or more items. Moreover, when terms or phrases such as "coupled" or "responsive" or "in response to" or "in communication with" are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

What is claimed:

1. A method for generating data comprising:
partitioning, by a processing device, data values of a base level into first partitions wherein the data values are stored in memory;
generating, by the processing device, a first level including second partitions, each of the second partitions including a respective extreme data value from each of the first partitions;
generating, by the processing device, an apex including at least one extreme data value from the second partitions of the first level that also corresponds to an extremum of the base level; and
updating, by the processing device, the first level if at least one partition of the first partitions receives a new extreme data value,
wherein the new extreme data value is stored in the apex if the new extreme data value comprises a new extremum of the base level.

2. The method of claim 1, further comprising:
generating, by the processing device, a second level, the second level including third partitions, each of the third partitions including extreme data values of the second partitions.

3. The method of claim 1, wherein the first partitions and the second partitions include different numbers of data values.

4. The method of claim 1, further comprising generating attribute data comprising:
generating, by the processing device, an attribute base level including attributes of data values of the base level;
generating, by the processing device, an attribute first level including attributes of data values of the first level; and
generating, by the processing device, an attribute apex including at least an attribute of an extremum of the base level.

5. The method of claim 4, wherein attributes of data values comprise positions of data values in the base level.

6. The method of claim 4, wherein attributes of data values comprise one of dictionary entries of Atoms, quantized amplitudes of Atoms, sign values, or colors.

7. The method of claim 1, wherein data values of the base level comprise two-dimensional data.

8. The method of claim 7, wherein data values of the base level are representative of image data or video data.

9. The method of claim 1, wherein data values of the base level comprise one-dimensional data.

10. The method of claim 9, wherein data values of the base level are representative of audio data.

11. The method of claim 1, wherein the data comprises a hierarchy of arrays or a tree.

12. The method of claim 1, wherein each of the first partitions include different numbers of data values.

13. The method of claim 1, further comprising:
storing, by the processing device, extreme data values of the first partitions in memory.

14. The method of claim 1, wherein data values of the base level comprise absolute values of inner products determined in a matching pursuits process.

15. The method of claim 1, wherein data values of the base level are representative of a Displaced Frame Difference (DFD) image.

16. A method for generating data, comprising:
partitioning, by a computing device, a base level data set into one or more partitions in memory;
generating, by the computing device, a coarse representation of extrema of each of the one or more partitions of the base level data by finding and storing the extrema of the partitions in memory; and
updating, by the computing device, the coarse representation if one or more data values of the base level data are altered, wherein the updating the coarse representation comprises finding and storing new extrema in memory from one of the one or more partitions of the base level data that includes altered data values.

17. The method of claim 16, further comprising:
generating, by the computing device, a hierarchy of successively coarser representations of extrema, each successive level in the hierarchy formed by finding and storing in memory extrema of a previous level's partitions;
updating, by the computing device, the hierarchy from the base level to a highest level for partitions of the base level data containing altered data values; and
identifying, by the computing device, extrema of the base level data by processing data held in the highest level of the hierarchy.

18. The method of claim 17, wherein the hierarchy of successively coarser representations comprises a hierarchy of arrays or a tree.

19. The method of claim 17, wherein the hierarchy of successively coarser representations comprises a hierarchy of levels, wherein each level above the base level includes extrema of a next lower level, the method further comprising:
partitioning, by the computing device, data values of each level, wherein partitions comprise different numbers of values within levels of the hierarchy and between different levels of the hierarchy.

20. The method of claim 17, wherein the partitions include two or more data values.

21. The method of claim 16, further comprising:
generating, by the computing device, a coarse representation of attributes of extrema of partitions of the base level data by finding and storing in memory the attributes of the extrema of the partitions; and
updating, by the computing device, the coarse representation of attributes in response to altering one or more data values of the base level data, wherein updating the coarse representation of attributes comprises finding and storing in memory attributes of new extrema only for corresponding partitions of the base level data that include altered data values.

22. The method of claim 16, wherein the base level data set is representative of at least one of image data, video data, and signal data.

23. The method of claim 22, wherein the signal data comprises audio data.

24. The method of claim 16, wherein the base level data set comprises one-dimensional data.

25. The method of claim 16, wherein the base level data set comprises two-dimensional or more than two-dimensional data.

26. The method of claim 16, wherein the base level data set comprises absolute values of inner products determined by a matching pursuits process.

27. The method of claim 16, wherein the base level data set is representative of a Displaced Frame Difference (DFD) image.

28. A method of encoding, comprising:
- partitioning, by a computer-based device, a set of data values into a plurality of first partitions wherein the set of data values are stored in memory;
- storing, by the computer-based device, a set of first extrema corresponding to extreme data values of the first partitions;
- altering, by the computer-based device, one or more data values to produce one or more altered first partitions; and
- updating, by the computer-based device, extreme data values of the set of first extrema corresponding to the one or more altered first partitions.

29. The method of claim 28, wherein storing the set of first extrema comprises:
- storing, by the computer-based device, the extreme data values of the first partitions in memory.

30. The method of claim 29, wherein updating extreme data values comprises:
- replacing, by the computer-based device, one or more of the extreme data values of the first partitions in memory.

31. The method of claim 28, further comprising:
- partitioning, by the computer-based device, the set of first extrema into a plurality of second partitions; and
- storing, by the computer-based device, a set of second extrema corresponding to extreme data values of the second partitions.

32. The method of claim 31, wherein altering one or more data values produces one or more altered second partitions, the method further comprising:
- updating, by the computer-based device, extrema values of the set of second extrema corresponding to the one or more altered second partitions.

33. The method of claim 28, wherein updating extreme data values of the set of first extrema comprises comparing data values of the one or more altered first partitions.

34. The method of claim 28, wherein updating extreme data values of the set of first extrema comprises replacing one or more extreme data values of the set of first extrema with one or more new extrema of the one or more altered first partitions.

35. The method of claim 28, further comprising:
- storing, by the computer-based device, a set of attributes corresponding to the set of first extrema;
- altering, by the computer-based device, one or more data values to produce one or more altered first partitions; and
- updating, by the computer-based device, the set of attributes in response to new extrema associated with the one or more altered first partitions.

36. The method of claim 28, wherein the set of data values is representative of at least one of image data, video data, and audio data.

37. The method of claim 28, wherein the set of data values comprises one-dimensional data, two-dimensional data, or more than two-dimensional data.

38. The method of claim 28, wherein the set of data values is representative of a Displaced Frame Difference (DFD) image.

39. An apparatus, comprising:
- an encoder, including a digital device, configured to use a hierarchical data structure to identify an extremum of a data set, wherein the hierarchical data structure comprises:
  - a base level including data values of the data set partitioned into first partitions;
  - a first level including second partitions, corresponding ones of the second partitions including respective extreme data values of the first partitions;
  - an apex including an extreme data value of the first level corresponding to an extremum of the base level; and
  - wherein the encoder is further configured to update the hierarchical data structure in response to a new extremum being saved in the base level.

40. The apparatus of claim 39, wherein the encoder is further configured to update the hierarchical data structure in response to a new extremum of the data set by, at least in part, storing the new extreme data value in the first level.

41. The apparatus of claim 39, wherein the encoder is further configured to update the hierarchical data structure in response to a new extremum of the data set by storing the new extreme data value in the apex if the new extreme data value comprises a new extremum of the base level.

42. The apparatus of claim 39, wherein the first level is partitioned into second partitions, and the first partitions and the second partitions include different numbers of data values.

43. The apparatus of claim 39, wherein the encoder is further configured to use an attribute data structure comprising:
- an attribute base level including attributes of data values of the base level of the hierarchical data structure;
- an attribute first level including attributes of data values of the first level of the hierarchical data structure; and
- an attribute apex including at least an attribute of an extremum of the base level of the hierarchical data structure.

44. The apparatus of claim 41, wherein attributes of data values comprise positions of data values in the base level of the hierarchical data structure.

45. The apparatus of claim 43, wherein attributes of data values comprise one of dictionary entries of Atoms, quantized amplitudes of Atoms, sign values, or colors.

46. The apparatus of claim 39, wherein data values of the base level are representative of one of image data, video data, or audio data.

47. The apparatus of claim 39, wherein data values of the base level comprise one of one-dimensional data, two-dimensional data, three-dimensional data, or greater-than-three-dimensional data.

48. The apparatus of claim 39, wherein the first partitions include different numbers of data values.

49. The apparatus of claim 39, further comprising:
- memory, wherein the encoder is further configured to store extreme data values of the first partitions in the memory.

50. The apparatus of claim 39, wherein data values of the base level comprise absolute values of inner products determined in a matching pursuits process.

51. The apparatus of claim 39, wherein the hierarchical data structure comprises a hierarchy of arrays or a tree.

52. The apparatus of claim 39, wherein data values of the base level are representative of a Displaced Frame Difference (DFD) image.

53. A tangible computer-readable medium having stored thereon, computer-executable instructions that, if executed by a machine, cause the machine to perform a method comprising:
- partitioning data values of a base level into first partitions;
- generating a first level including second partitions, each of the second partitions including a respective extreme data value of corresponding ones of the first partitions;
- generating an apex including an extreme data value of the first level corresponding to an extremum of the base level; and
- modifying the first level in response to at least one of the first partitions receiving a new extreme data value, wherein the new extreme data value is stored in the apex if the new extreme data value comprises a new extremum of the base level.

54. The tangible computer-readable medium of claim 53, containing further computer-executable instructions that, if executed by the machine, cause the machine to perform a method comprising:

generating a second level of the data including third partitions, each of the third partitions including respective extreme data values of a corresponding one of the second partitions.

55. The tangible computer-readable medium of claim 53, containing further computer-executable instructions that, if executed by the machine, cause the machine to perform a method comprising generating attribute data comprising:

generating an attribute base level including attributes of data values of the base level;

generating an attribute first level including attributes of data values of the first level; and generating an attribute apex including at least an attribute of an extremum of the base level.

56. The tangible computer-readable medium of claim 55, wherein attributes of data values comprise positions of data values in the base level of the data structure.

57. The tangible computer-readable medium of claim 55, wherein attributes of data values comprise one of dictionary entries of Atoms, quantized amplitudes of Atoms, sign values, or colors.

58. The tangible computer-readable medium of claim 53, containing further computer-executable instructions that, if executed by the machine, cause the machine to perform a method comprising:

storing extreme data values of the first partitions in memory.

59. The tangible computer-readable medium of claim 53, wherein data values of the base level comprise absolute values of inner products determined in a matching pursuits process.

* * * * *